United States Patent
Ota et al.

(10) Patent No.: US 12,334,964 B2
(45) Date of Patent: Jun. 17, 2025

(54) WIRELESS COMMUNICATION APPARATUS AND DISTORTION COMPENSATION METHOD

(71) Applicant: FUJITSU LIMITED, Kawasaki (JP)

(72) Inventors: Tomoya Ota, Kawasaki (JP); Hiroyoshi Ishikawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 301 days.

(21) Appl. No.: 17/877,441

(22) Filed: Jul. 29, 2022

(65) Prior Publication Data

US 2023/0142029 A1     May 11, 2023

(30) Foreign Application Priority Data

Nov. 11, 2021   (JP) ................. 2021-184064

(51) Int. Cl.
*H04B 1/04*     (2006.01)
(52) U.S. Cl.
CPC ......... *H04B 1/0483* (2013.01); *H04B 1/0475* (2013.01); *H04B 2001/0433* (2013.01)
(58) Field of Classification Search
CPC ............... H04B 1/0483; H04B 1/0475; H04B 2001/0433
USPC ... 455/552.1, 562.1, 63.1, 67.13, 501, 114.3, 455/127.3
See application file for complete search history.

(56) References Cited

U.S. PATENT DOCUMENTS

| | | | |
|---|---|---|---|
| 9,118,361 B2 | 8/2015 | Barker et al. | |
| 11,563,464 B2 * | 1/2023 | Ota | H04B 1/7107 |
| 2004/0077379 A1 | 4/2004 | Smith et al. | |
| 2018/0007718 A1 | 1/2018 | Tujkovic et al. | |
| 2019/0199454 A1 | 6/2019 | Komatsuzaki et al. | |
| 2019/0273541 A1 | 9/2019 | Ohshima et al. | |

(Continued)

FOREIGN PATENT DOCUMENTS

| | | |
|---|---|---|
| JP | 2018-195955 A | 12/2018 |
| JP | 2019-114961 A | 7/2019 |
| JP | 2019-154024 A | 9/2019 |

(Continued)

OTHER PUBLICATIONS

Abdelaziz, M. et al., "Digital Predistortion for Hybrid MIMO Transmitters"; IEEE Journal of Selected Topics in Signal Processing, vol. 12, No. 3, (10 pages Total), (Jun. 2018).

(Continued)

*Primary Examiner* — Nghi H Ly

(74) *Attorney, Agent, or Firm* — ArentFox Schiff LLP

(57) ABSTRACT

A wireless communication apparatus includes a plurality of antenna elements; a plurality of power amplifiers provided in the plurality of antenna elements; a processor that outputs a transmission signal to the plurality of power amplifiers; and a plurality of feedback paths each of which allows a feedback signal to be fed back from the plurality of power amplifiers to the processor, wherein the processor executes a process for collectively correcting variations in analog characteristics exhibited in the plurality of feedback paths, and a process for updating, by using the transmission signal and the feedback signal that are obtained by being corrected, a distortion compensation coefficient that is used to compensate nonlinear distortion produced in the plurality of power amplifiers.

10 Claims, 16 Drawing Sheets

(56) References Cited

U.S. PATENT DOCUMENTS

2020/0105289 A1    4/2020  Onizuka et al.
2021/0351517 A1    11/2021  Mishra et al.

FOREIGN PATENT DOCUMENTS

JP        2019-208165 A    12/2019
JP        2019-220816 A    12/2019
WO     2018/230062 A1   12/2018

OTHER PUBLICATIONS

Habu, S. et al., "Outband Radiation and Modulation Accuracy of Unified Beamforming DPD"; 2018 IEEE 29th Annual International Symposium on Personal, Indoor, and Mobile Radio Communications (PIMRC), (6 pages Total), (2018).

Lozhkin, A. N., et al., "New Predistorter Architecture for Hybrid Beamforming Transmitter", 2020 IEEE 92nd Vehicular Technology Conference (VTC2020—Fall) | 978-1-7281-9484-4/20/$31.00 © 2020 IEEE, (6 pages Total), (2020).

Non-Final Office Action issued by the United States Patent and Trademark Office in U.S. Appl. No. 17/472,739, mailed Jun. 23, 2022.

Notice of Allowance issued by the United States Patent and Trademark Office in U.S. Appl. No. 17/472,739, mailed Sep. 19, 2022.

Office Action received for Japanese Patent Application No. 2021-184064, mailed on Dec. 24, 2024, 20 pages (12 pages of English Translation and 8 pages of Original Document).

Office Action received for Japanese Patent Application No. 2021-184064, mailed on Mar. 18, 2025, 8 pages (5 pages of English Translation and 3 pages of Original Document).

\* cited by examiner

WIRELESS COMMUNICATION APPARATUS AND DISTORTION COMPENSATION METHOD

CROSS-REFERENCE TO RELATED APPLICATION

This application is based upon and claims the benefit of priority of the prior Japanese Patent Application No. 2021-184064, filed on Nov. 11, 2021, the entire contents of which are incorporated herein by reference.

FIELD

The embodiments discussed herein are related to a wireless communication apparatus and a distortion compensation method.

BACKGROUND

In recent years, there is a growing need for power amplifiers operated with high efficiency from the viewpoint of downsizing transmission devices, a reduction in operational costs, and environmental issues. When a power amplifier is operated with high efficiency, in an area in which input electrical power is relatively high, the input electrical power is not subjected to linear amplification and nonlinear distortion is produced accordingly. Thus, in some cases, an amplification method that uses, in combination with digital predistortion that previously adds distortion having an inverse characteristic of the nonlinear distortion produced in the power amplifier to a transmission signal is used. The distortion that is previously added to the transmission signals in digital predistortion is also called a distortion compensation coefficient and is read from a look-up table or is calculated by using a polynomial equation. Then, the distortion compensation coefficient is appropriately updated such that the nonlinear distortion that varies in accordance with an environment, such as temperature, is sufficiently compensated.

In contrast, beamforming that forms directional beams in order to improve the capacity of a communication system by reducing interference of the transmission signal in the direction other than a destination is sometimes performed. If the beamforming is performed, phase differences are set to signals that are transmitted from a plurality of antenna elements constituting an array antenna. Each of the plurality of antenna elements is provided with, for example, a phase shifter, and the phases of the signals are controlled, and the signals that have been subjected to phase control are amplified by the power amplifiers associated with the respective antenna elements.

In this way, even in the case where the power amplifier is provided in each of the plurality of antenna elements, a method for collectively performing digital predistortion on the transmission signals is proposed. In other words, studies have been conducted on a method for performing distortion compensation on the transmission signals by using a distortion compensation coefficient, and then, demultiplexing the processed transmission signals, amplifying the transmission signals by using the power amplifiers provided in the respective antenna elements, and transmitting the transmission signals from the respective antenna elements.

Patent Document 1: Japanese Laid-open Patent Publication No. 2019-154024
Patent Document 2: Japanese Laid-open Patent Publication No. 2019-220816
Patent Document 3: Japanese Laid-open Patent Publication No. 2018-195955

Incidentally, if digital predistortion is collectively performed with respect to the plurality of power amplifiers, the distortion compensation coefficient is updated by using a feedback signal that is fed back from each of the power amplifiers. At this time, the feedback signal that is output from each of the power amplifiers is fed back by way of a different feedback path that is associated with each of the associated plurality of antenna elements.

However, the feedback paths associated with the respective plurality of antenna elements each have a different analog characteristic each other, so that there is a problem in that an error is produced in the feedback signals passing through the respective feedback paths caused by the variations in the analog characteristics, and a distortion compensation performance is decreased accordingly.

Specifically, in the feedback paths from the respective power amplifiers, variations occur in the analog characteristics, such as gain, phase, delay, and frequency characteristics, so that an error is produced in the feedback signals caused by these analog characteristics. Then, the distortion compensation coefficient is updated on the basis of the feedback signals and the transmission signal, so that the accuracy of the distortion compensation coefficient is decreased, and thus, the distortion compensation performance is decreased.

In order to correct this type of variations in the analog characteristics exhibited in the feedback path, it is conceivable to individually estimate, for example, the gain, phase, delay, and frequency characteristics exhibited in each of the feedback paths and correct the analog characteristic for each feedback path. However, if the gain, phase, delay, and frequency characteristics are corrected in accordance with each of the feedback paths, the number of multipliers needed for the correction is increased, and the electrical power consumption is accordingly increased. In particular, an array antenna that is recently used includes a lot of antenna elements, so that the number of feedback paths is increased, and thus, operating multipliers associated with the respective feedback paths is impractical.

SUMMARY

According to an aspect of an embodiment, a wireless communication apparatus includes a plurality of antenna elements; a plurality of power amplifiers provided in the plurality of antenna elements; a processor that outputs a transmission signal to the plurality of power amplifiers; and a plurality of feedback paths each of which allows a feedback signal to be fed back from the plurality of power amplifiers to the processor. The processor executes a process comprising collectively correcting variations in analog characteristics exhibited in the plurality of feedback paths, and updating, by using the transmission signal and the feedback signal that are obtained by being corrected, a distortion compensation coefficient that is used to compensate nonlinear distortion produced in the plurality of power amplifiers.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The present invention is not limited to the embodiments.

[a] First Embodiment

Figure 1:
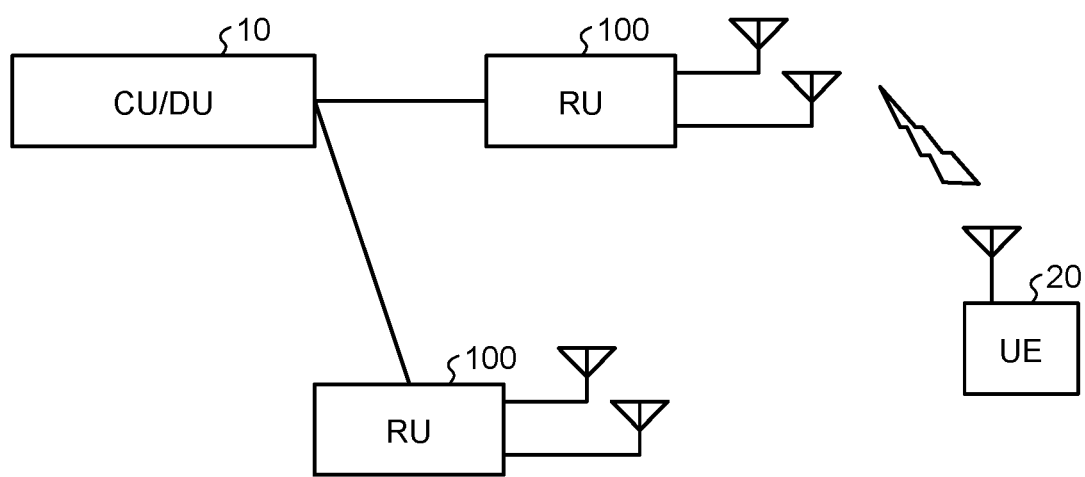
FIG. 1 is a diagram illustrating an example of a communication system according to a first embodiment.

FIG. 1 is a diagram illustrating an example of a communication system according to a first embodiment. In the communication system illustrated in FIG. 1, a plurality of radio units (RUs) 100 are connected to a central unit/distributed unit (CU/DU) 10, and the RU 100 and a user equipment (UE) 20 perform wireless communication. Furthermore, the CU/DU 10 need not always be configured as an integrated device, but may be configured such that a CU and a DU are configured as separated devices.

The CU/DU 10 is a device that performs a baseband process on a signal, and is a device that, for example, generates a transmission baseband signal by encoding information and transmits the generated signal to the RU 100, or that decodes a reception baseband signal received from the RU 100.

Each of the RUs 100 is connected to the CU/DU 10 in a wired manner, and performs a wireless transmission process on the transmission baseband signal generated by the CU/DU 10 or performs a wireless reception process on a reception signal received from the UE 20 to generate a reception baseband signal and transmits the generated signal to the CU/DU 10. Furthermore, each of the RUs 100 is a wireless communication apparatus that includes a plurality of antenna elements and performs, at the time of wireless communication with the UE 20, beamforming by adding an antenna weight to the plurality of antenna elements. Furthermore, each of the RUs 100 performs digital predistortion that compensates nonlinear distortion generated in a power amplifier that is provided for each antenna element. In digital predistortion, a distortion compensation coefficient is multiplied to a transmission signal; however, an update of the distortion compensation coefficient is performed after variations in analog characteristics exhibited in a feedback path through which a feedback signal received from each of the antenna elements passes have been corrected. A configuration and an operation of each of the RUs 100 will be described in detail later.

The UE 20 is a user terminal device, such as a mobile telephone or a smartphone, and performs wireless communication with the RU 100.

Figure 2:
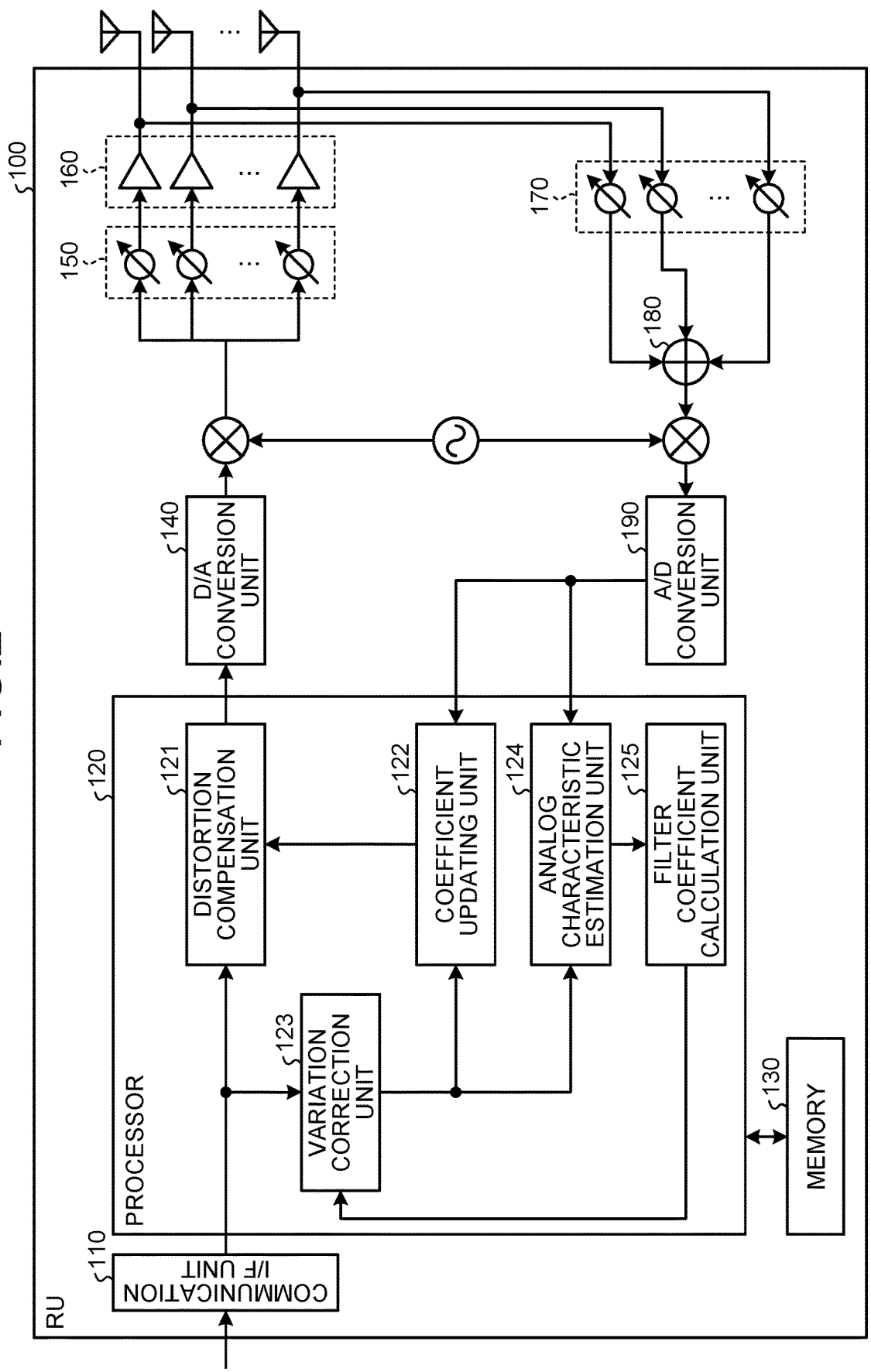
FIG. 2 is a block diagram illustrating a configuration of an RU according to the first embodiment.

FIG. 2 is a block diagram illustrating a configuration of the RU 100 according to the first embodiment. The RU 100 illustrated in FIG. 2 includes a communication interface unit (hereinafter, simply referred to as a "communication I/F unit") 110, a processor 120, a memory 130, a digital/analog (D/A) conversion unit 140, phase shifters 150, power amplifiers 160, phase shifters 170, a combination unit 180, and an analog/digital (A/D) conversion unit 190. Furthermore, FIG. 2 illustrates processing units associated with a process for transmitting a signal to the UE 20, and processing units associated with a process for receiving a signal from the UE 20 are not illustrated.

The communication I/F unit 110 is an interface that is connected to the CU/DU 10 in a wired manner, and transmits and receives a baseband signal to and from the CU/DU 10. Specifically, the communication I/F unit 110 receives the transmission baseband signal that has been transmitted from the CU/DU 10 and transmits a reception baseband signal to the CU/DU 10.

The processor 120 includes, for example a central processing unit (CPU), a field programmable gate array (FPGA), a digital signal processor (DSP), or the like, and performs overall control of the RU 100. Specifically, the processor 120 performs distortion compensation that is a process for multiplying a distortion compensation coefficient by the transmission baseband signal that has been received by the communication I/F unit 110, and performs an update of the distortion compensation coefficient. At this time, the processor 120 collectively corrects the variations in the analog characteristics exhibited in the feedback paths from the plurality of antenna elements, and then, updates the distortion compensation coefficient on the basis of the transmission signal and the feedback signal. An internal configuration of the processor 120 will be described later.

The memory 130 includes, for example, a random access memory (RAM), a read only memory (ROM), or the like, and stores various kinds of information when a process is performed by the processor 120.

The D/A conversion unit 140 performs D/A conversion on a transmission signal subjected to distortion compensation by the processor 120. The analog transmission signal obtained from D/A conversion is subjected to up-conversion by an up-converter and becomes a transmission signal with a radio frequency.

The phase shifter 150 is provided in association with each of the plurality of antenna elements, and adds an antenna weight to a signal associated with each of the antenna elements. In other words, each of the phase shifters 150 sets a phase difference to a signal associated with each of the antenna elements, and performs beamforming that controls the direction of a directional beam.

The power amplifier 160 is provided in association with each of the plurality of antenna elements, and amplifies the signal associated with each of the antenna elements. In other words, each of the power amplifiers 160 amplifies each of the signals to which the antenna weight is added, and transmits the amplified signals from the respective antenna elements. Nonlinear distortion is generated in the signal when amplification is performed by the power amplifier 160; however, in the present embodiment, distortion compensation has been performed by the processor 120, so that, if the signals transmitted from the respective antenna elements are combined in wireless space, the nonlinear distortion component included in each of the combine signals is reduced.

The phase shifter 170 is provided in association with each of the plurality of antenna elements, allows the signal that is output from the power amplifier 160 provided in each of the antenna elements to be fed back, and adds an inverse weight to a feedback signal (hereinafter, simply referred to as a "FB signal"). In other words, each of the phase shifters 170 adds, to the FB signal, an inverse weight that cancels out the antenna weight that is added to each of the antenna elements by the phase shifter 150.

The combination unit 180 combines the FB signals received from the respective plurality of antenna elements. In other words, the combination unit 180 combines the FB signals that are output from the associated power amplifiers 160 included in the respective antenna elements and in each of which the inverse weight is added. Each of the FB signals combined by the combination unit 180 passes through a different feedback path, and is thus affected by variations in analog characteristics exhibited in the feedback paths.

The A/D conversion unit 190 performs A/D conversion on the FB signals that are combined by the combination unit 180. Then, the A/D conversion unit 190 outputs the FB signals subjected to A/D conversion to the processor 120.

In the following, an internal configuration of the processor 120 will be described. As illustrated in FIG. 2, the processor 120 includes a distortion compensation unit 121, a coefficient updating unit 122, a variation correction unit 123, an analog characteristic estimation unit 124, and a filter coefficient calculation unit 125.

The distortion compensation unit 121 applies a distortion compensation coefficient to the transmission baseband signal, and performs distortion compensation. In other words, the distortion compensation unit 121 performs distortion compensation that compensates nonlinear distortion generated in the power amplifiers 160 by using, for example, a look-up table or a polynomial equation. The distortion compensation unit 121 outputs the transmission signal that has been subjected to distortion compensation to the D/A conversion unit 140.

The coefficient updating unit 122 performs an update process on the distortion compensation coefficient by comparing the transmission signal that has not been subjected to distortion compensation to the FB signal. Specifically, the coefficient updating unit 122 calculates a distortion compensation coefficient that minimizes an error between the transmission signal and the FB signal by using, for example, the least mean square (LMS) error algorithm. Then, the coefficient updating unit 122 notifies the distortion compensation unit 121 of the calculated distortion compensation coefficient. A nonlinear distortion component that is generated in each of the power amplifiers 160 is not included in the transmission signal that is input to the coefficient updating unit 122, so that it is possible to calculate a distortion compensation coefficient that compensates the nonlinear distortion component by performing an update process such that the error between the transmission signal and the FB signal is minimized.

The variation correction unit 123 corrects the variations in the analog characteristics exhibited in the feedback paths received from the plurality of antenna elements. Specifically, the variation correction unit 123 includes, for example, a finite impulse response (FIR) filter; sets, to the FIR filter, a filter coefficient (hereinafter, referred to as a "batch filter coefficient") that collectively corrects the variations in the analog characteristics exhibited in the plurality of feedback paths; and allows the transmission signal to pass the FIR filter. The FIR filter included in the variation correction unit 123 adds, to the transmission signal, a characteristic corresponding to the analog characteristic of each of the plurality of feedback paths. As a result, similarly to the FB signal passing through the feedback path, the characteristics corresponding to the analog characteristics exhibited in the plurality of feedback paths are added to the transmission signal that is input to the coefficient updating unit 122, so that it is possible to correct the variations in the analog characteristics. Furthermore, the variation correction unit 123 collectively corrects the variations in the analog characteristics by using one FIR filter, so that it is possible to minimize the number of multipliers that are used for the correction, and it is thus possible to suppress an increase in electrical power consumption.

The analog characteristic estimation unit 124 estimates an analog characteristic exhibited in each of the feedback paths from both of the transmission signal that has not been subjected to distortion compensation and the FB signal. Specifically, the analog characteristic estimation unit 124 estimates, regarding the feedback path related to each of the plurality of antenna elements, the gain, phase, delay, and frequency characteristics. At this time, the analog characteristic estimation unit 124 acquires the FB signal associated with each of the feedback paths, and estimates the gain, phase, delay, and frequency characteristics exhibited in each of the feedback paths by using both of the transmission signal that has not been subjected to distortion compensation and the FB signal associated with each of the feedback paths. It may be configured such that, when the FB signal associated with each of the feedback paths is acquired, by setting the gain of the phase shifter 170 associated with one feedback path to 0 dB, and setting the gain of the phase shifter 170 associated with the other feedback paths to $-\infty$ dB, only the FB signal passing through the feedback path in which the gain is set to 0 dB is input to the analog characteristic estimation unit 124.

The filter coefficient calculation unit 125 calculates, on the basis of the analog characteristic exhibited in each of the feedback paths, the batch filter coefficient that is set in the variation correction unit 123. Specifically, the filter coefficient calculation unit 125 calculates, from the gain, phase, delay, and frequency characteristics exhibited in each of the feedback paths, the path based filter coefficient that is associated with the analog characteristic exhibited in each of the feedback paths. In other words, the filter coefficient calculation unit 125 calculates a piece of path based filter coefficient for each feedback path. Then, the filter coefficient calculation unit 125 calculates the batch filter coefficient by obtaining the sum of the path based filter coefficients associated with the respective feedback path. The filter coefficient calculation unit 125 notifies the variation correction unit 123 of the calculated batch filter coefficient.

Figure 3:
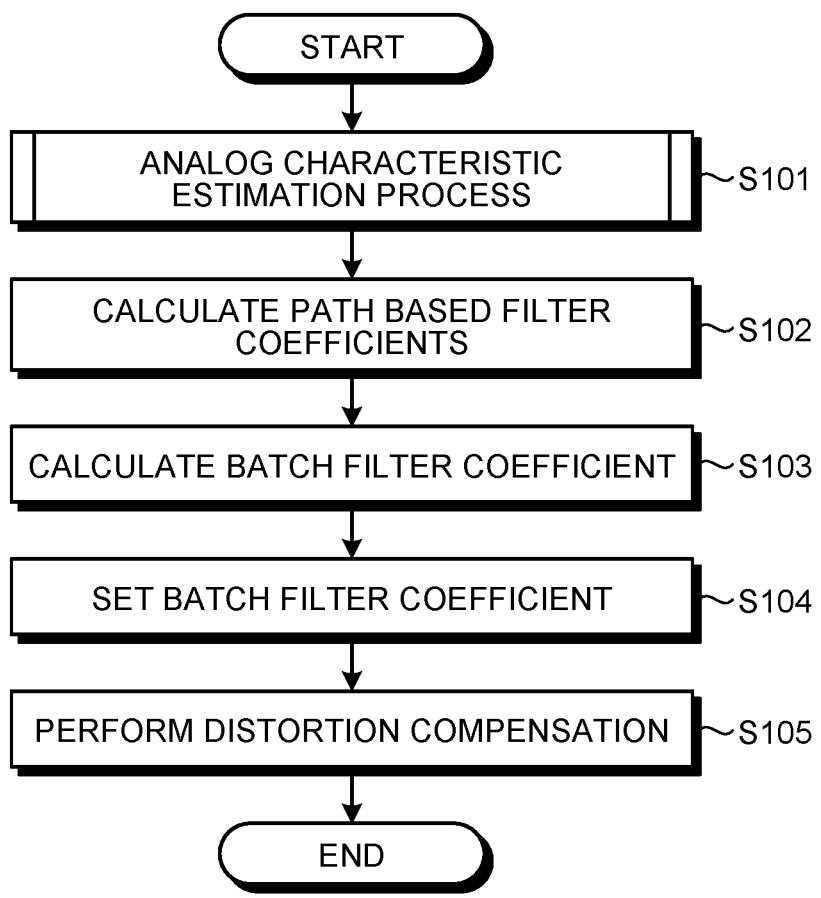
FIG. 3 is a flowchart illustrating a distortion compensation method according to the first embodiment.

In the following, the distortion compensation method performed by the RU 100 having the configuration described above will be described with reference to the flowchart illustrated in FIG. 3.

A process for setting the batch filter coefficient in the variation correction unit 123 is performed in a predetermined time period, such as at the time of startup of the RU 100 or update of the filter coefficient that is performed in a predetermined cycle. The transmission baseband signal transmitted from the CU/DU 10 during this time period is received by the communication I/F unit 110 and is input to the processor 120. Then, the transmission signal passes through the variation correction unit 123 and is input to the analog characteristic estimation unit 124.

Furthermore, after the transmission signal is subjected to distortion compensation by the distortion compensation unit 121, is subjected to D/A conversion and up-conversion, an antenna weight for beamforming is added to the transmission signal by the phase shifter 150, and the transmission signal is amplified by the power amplifier 160 and is then transmitted to a wireless space after having been. At this time, the signal that has been amplified by the power amplifier 160 is fed back to the phase shifter 170, is subjected to down-conversion and A/D conversion, and is then input to the analog characteristic estimation unit 124 as the FB signal.

In the analog characteristic estimation unit 124 in which the transmission signal and the FB signal are input, a process for estimating an analog characteristic in the feedback path is performed by using the transmission signal and the FB signal (Step S101). Specifically, the gain, phase, delay, and frequency characteristics in each of the feedback paths that are associated with the respective plurality of antenna elements are estimated. In other words, as a result of the gain of the phase shifter 170 being adjusted, the FB signal associated with one feedback path is input to the analog characteristic estimation unit 124, and the gain, phase, delay, and frequency characteristics related to this feedback path is estimated. By repeatedly performing the process for estimating the analog characteristic for each feedback path performed in this way, the analog characteristics in all of the feedback paths are estimated. The analog characteristic estimation process performed by the analog characteristic estimation unit 124 will be described in detail later.

When the analog characteristic for each feedback path has been estimated, the path based filter coefficient associated with the analog characteristic for each feedback path is calculated by the filter coefficient calculation unit 125 (Step S102). In other words, the path based filter coefficient that represents the gain, phase, delay, and frequency characteristics exhibited in each of the feedback paths by one FIR filter is calculated. Therefore, the same number of path based filter coefficients as the number of feedback paths are calculated by the filter coefficient calculation unit 125.

Then, the batch filter coefficient is calculated by obtaining the sum of the path based filter coefficients by the filter coefficient calculation unit 125 (Step S103). The batch filter coefficient is the filter coefficient that represents the analog characteristics exhibited in the plurality of feedback paths by one FIR filter.

The batch filter coefficient is notified to the variation correction unit 123, and is set to the FIR filter that is included in the variation correction unit 123 (Step S104). As a result, the setting process that is performed in a predetermined time period, such as at the time of startup of the RU 100 or update of the filter coefficient, has been completed. When the batch filter coefficient has been set in the variation correction unit 123, the usual signal transmission process is performed after this. In other words, after the transmission signal is subjected to distortion compensation by the distortion compensation unit 121 (Step S105) and is subjected to D/A conversion and up-conversion, an antenna weight for beamforming is added to the transmission signal by the phase shifter 150, and the transmission signal is amplified by the power amplifier 160 and is then transmitted to the wireless space.

Furthermore, the signals that have been amplified by the respective power amplifiers 160 associated with the respective antenna elements are fed back via the respective feedback paths and are combined after an inverse weight is added to each of the signals by the phase shifter 170. The combined FB signal is input to the coefficient updating unit 122. In contrast, the same characteristics as the analog characteristics exhibited in each of the feedback paths are collectively added to the transmission signal that has not been subjected to distortion compensation by the variation correction unit 123, and the corrected transmission signal is input to the coefficient updating unit 122. Then, the transmission signal and the FB signal are used by the coefficient updating unit 122, so that the distortion compensation coefficient that is used by the distortion compensation unit 121 is updated.

At the time of update of the distortion compensation coefficient, the FB signal obtained by combining the signals each passing through a different feedback path and the transmission signal are used; however, the same characteristics as the analog characteristics exhibited in the respective feedback paths are added to the transmission signals, so that it is possible to reduce the effect of variations in the analog characteristics. As a result, it is possible to improve the accuracy of the distortion compensation coefficient, and prevent a decrease in distortion compensation performance. Furthermore, when the same characteristics as the analog characteristics exhibited in the respective feedback paths are added to the transmission signals, only one FIR filter included in the variation correction unit 123 is operated, it is thus possible to suppress an increase in electrical power consumption.

Figure 4:
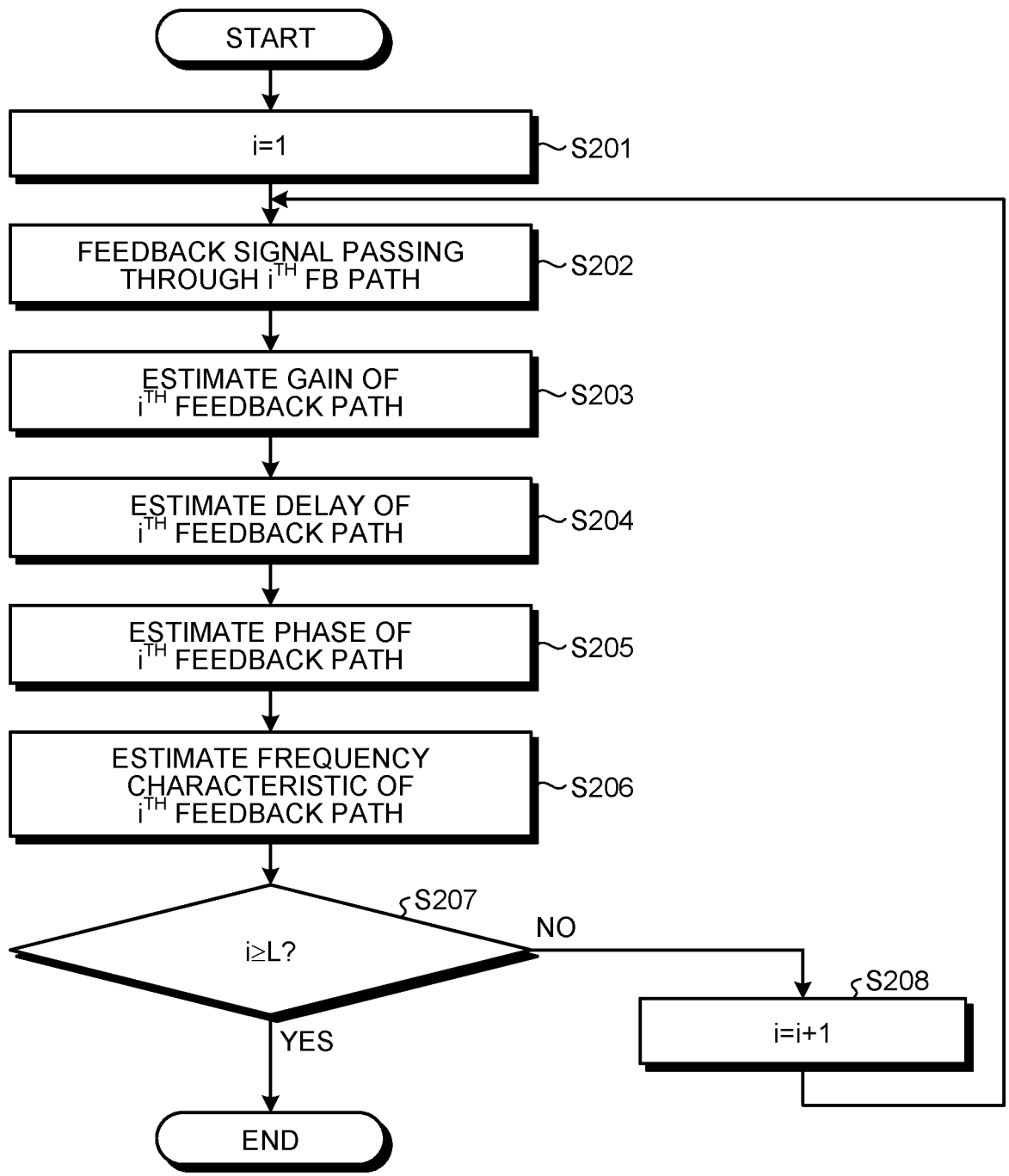
FIG. 4 is a flowchart illustrating an analog characteristic estimation process.

In the following, an analog characteristic estimation process for estimating an analog characteristic in a feedback path will be specifically described with reference to the flowchart illustrated in FIG. 4. The analog characteristic estimation process described below is mainly performed by the analog characteristic estimation unit 124. Here, it is assumed that the RU 100 includes L antenna elements (L is an integer greater than or equal to 2), and L feedback paths are also present.

First, a variable i for counting the processed feedback path is set to 1 as an initial setting (Step S201), the gain of the phase shifter 170 is set such that only the signal passing through the $i^{th}$ feedback path is to be fed back (Step S202). In other words, the gain of the phase shifter 170 associated with the $i^{th}$ feedback path is set to 0 dB, the gain of each of the phase shifters 170 associated with the other feedback paths is set to $-\infty$ dB. Accordingly, only the FB signal passing through the $i^{th}$ feedback path is input to the analog characteristic estimation unit 124.

Then, the gain of the $i^{th}$ feedback path is estimated (Step S203). Specifically, time integral electrical power $P_T$ of the transmission signal and time integral electrical power $P_{FB}$ of the FB signal are calculated by Equations (1) and (2) below, respectively.

$$P_T = \sum_{n=0}^{N-1} \{\text{Re}\,[x(n)]\}^2 + \sum_{n=0}^{N-1} \{\text{Im}\,[x(n)]\}^2 \qquad (1)$$

-continued $$P_{FB} = \sum_{n=0}^{N-1} \{Re\,[y(n)]\}^2 + \sum_{n=0}^{N-1} \{Im\,[y(n)]\}^2 \quad (2)$$

Then, a gain g of the feedback path is calculated by Equation (3) below.

$$g = \sqrt{\frac{P_{FB}}{P_T}} \quad (3)$$

Then, a delay of the $i^{th}$ feedback path is estimated (Step S204). Specifically, by setting a predetermined coefficient to the delay FIR filter, a delay in accordance with a coefficient set is added to the transmission signal. Here, for example, a coefficient set with a coefficient set number 1 is set to the delay FIR filter, the delay in accordance with this coefficient set is added to a transmission signal x(n), so that a signal u(n) indicated by Equation (4) below is obtained.

$$u(n) = \sum_{k=0}^{K-1} w(k)x\left(n - \frac{K}{2} + k\right) \quad (4)$$

In Equation (4), K denotes the number of taps included in the delay FIR filter, w(k) denotes a coefficient of a coefficient set that is being set. Then, the real part Re[Corr] and the imaginary part Im[Corr] of the correlation value between the signal u(n) and the FB signal y(n) are calculated by Equations (5) and (6) below respectively, where, in Equations (5) and (6), Re[x] denotes the real part of x, and Im[x] denotes the imaginary part of x.

$$Re\,[Corr] = \sum_{n=0}^{N-1} \{Re\,[u(n)] \times Re\,[y(n)] + Im\,[u(n)] \times Im\,[y(n)]\} \quad (5)$$

$$Im\,[Corr] = \sum_{n=0}^{N-1} \{Re\,[u(n)] \times Im\,[y(n)] - Im\,[u(n)] \times Re\,[y(n)]\} \quad (6)$$

The electrical power of the correlation value is calculated from the real part and the imaginary part of the correlation value, the correlation value electrical power associated with the coefficient set number 1 of the delay FIR filter described above is calculated. After this, calculation of the correlation value electrical power is repeated for each coefficient set of the delay FIR filter, and the coefficient set of the delay FIR filter in which the correlation value electrical power is the maximum is specified. The coefficient set of the specified delay FIR filter is associated with the delay of the $i^{th}$ feedback path. In addition, here, the delay that is less than a clock is estimated; however, a delay in units of clocks may separately be estimated.

Then, the phase of the $i^{th}$ feedback path is estimated (Step S205). Specifically, the real part and the imaginary part of the correlation value between the transmission signal and the FB signal are calculated in a similar manner as that used in Equations (5) and (6) above, respectively. In other words, in Equations (5) and (6) above, the transmission signal x(n) is used instead of the signal u(n), and the real part Re[Corr] and the imaginary part Im[Corr] of the correlation value between the transmission signal x(n) and the FB signal y(n) are calculated, respectively.

Then, a phase θ of the feedback path is calculated by Equation (7) below.

$$\theta = \tan^{-1}\frac{Im\,[Corr]}{Re\,[Corr]} \quad (7)$$

Then, the frequency characteristic of the $i^{th}$ feedback path is estimated (Step S206). Specifically, a predetermined coefficient set is set in the frequency characteristic FIR filter, and the frequency characteristic in accordance with the coefficient set is added to the transmission signal. Here, for example, the coefficient set of the coefficient set number 1 is set in the frequency characteristic FIR filter, and the frequency characteristic in accordance with this coefficient set is added to the transmission signal x(n), so that the signal u(n) similar to that obtained by Equation (4) above is obtained. However, at the time of estimation of the frequency characteristic, K indicated by Equation (4) above denotes the number of taps of the frequency characteristic FIR filter.

Then, the real part Re[Corr] and the imaginary part Im[Corr] of the correlation value between the signal u(n) and the FB signal y(n) are calculated in a similar manner as that used in Equations (5) and (6) above, respectively. The electrical power of the correlation value is calculated from the real part and the imaginary part of the correlation value is calculated, and the correlation value electrical power associated with the coefficient set number 1 of the frequency characteristic FIR filter described above is calculated. After this, calculation of the correlation value electrical power is repeated for each coefficient set of the frequency characteristic FIR filter, and the coefficient set of the frequency characteristic FIR filter in which the correlation value electrical power is the maximum is specified. The coefficient set of the specified frequency characteristic FIR filter is associated with the frequency characteristic of the $i^{th}$ feedback path. Furthermore, it is desirable for the estimation of the frequency characteristic to use the transmission signal that has been subjected to correction related to the delay. Furthermore, the coefficient of the frequency characteristic FIR filter may be a complex number.

By performing the processes described above, the analog characteristic associated with the $i^{th}$ feedback path is estimated. Then, it is determined whether or not the variable i is greater than or equal to L that is the number of feedback paths (Step S207), and, if the variable i is greater than or equal to L (Yes at Step S207), the analog characteristics exhibited in all of the feedback paths have been estimated, so that the analog characteristic estimation process is ended. In contrast, if the variable i is less than L (No at Step S207), a feedback path in which the analog characteristic has not been estimated is present, the variable i is incremented (Step S208), and the analog characteristic estimation process related to the $i^{th}$ feedback path is repeated. Accordingly, the gain, delay, phase, and frequency characteristics exhibited in all of the feedback paths are estimated.

Then, a specific example of calculation of the path based filter coefficient will be described. If the analog characteristic exhibited in each of the feedback paths has been estimated, the path based filter coefficient is calculated by the filter coefficient calculation unit 125.

Figure 5:
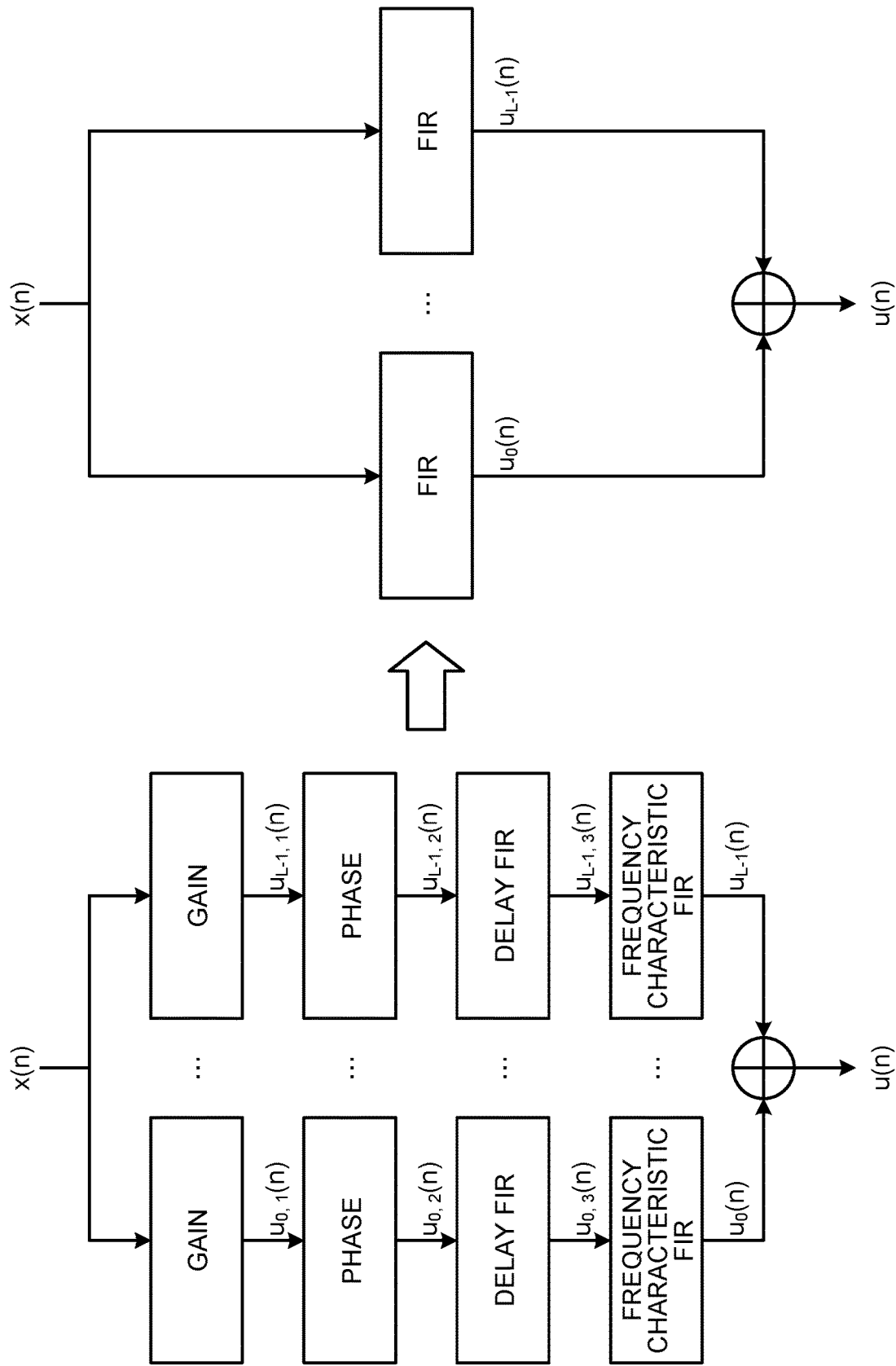
FIG. 5 is a diagram illustrating calculation of a path based filter coefficient.

As illustrated in FIG. 5, the path based filter coefficient is a filter coefficient of the FIR filter associated with the respective L feedback paths between a path 0 and a path (L−1), and corresponds to the gain, phase, delay, and frequency characteristics exhibited in each of the feedback paths. Here, a case in which a path based filter coefficient that can be used to obtain the signal u(n) to which the analog characteristic of each of the feedback paths is added is calculated from the transmission signal x(n) is considered.

As illustrated on the left side of FIG. 5, if a gain correction output of a path i is denoted by $u_{i,1}(n)$, $u_{i,1}(n)$ can be represented by Equation (8) below by using an amplitude gain $g_i$ of the real number of the path i.

$$u_{i,1}(n) = g_i x(n) \quad (8)$$

In addition, if a phase correction output of the path i is denoted by $u_{i,2}(n)$, $u_{i,2}(n)$ can be represented by Equation (9) below by using a phase $\theta_i$ of the real number of the path i.

$$u_{i,2}(n) = u_{i,1}(n)e^{j\theta_i} = g_i e^{j\theta_i} x(n) \quad (9)$$

Then, if a delay correction output of the path i is denoted by $u_{i,3}(n)$, $u_{i,3}(n)$ can be represented by Equation (10) below by using the coefficient set $w_{i,1}(k_1)$ of the delay FIR filter of the path i and the number of taps $K_1$ of the delay FIR filter.

$$u_{i,3}(n) = \sum_{k_1=0}^{K_1-1} w_{i,1}(k_1) u_{i,2}\left(n - \frac{K_1}{2} + k_1\right) \quad (10)$$

$$= \sum_{k_1=0}^{K_1-1} g_i e^{j\theta_i} w_{i,1}(k_1) x\left(n - \frac{K_1}{2} + k_1\right)$$

Similarly, if a frequency characteristic correction output of the path i is denoted by $u_i(n)$, $u_i(n)$ can be represented by Equation (11) below by using the coefficient set $w_{i,2}(k_2)$ of the frequency characteristic FIR filter of the path i and the number of taps $K_2$ of the frequency characteristic FIR filter.

$$u_i(n) = \sum_{k_2=0}^{K_2-1} w_{i,2}(k_2) u_{i,3}\left(n - \frac{K_2}{2} + k_2\right) \quad (11)$$

$$= \sum_{k_1=0}^{K_1-1}\sum_{k_2=0}^{K_2-1} g_i e^{j\theta_i} w_{i,1}(k_1) w_{i,2}(k_2) x\left(n - \frac{K_1 + K_2}{2} + k_1 + k_2\right)$$

From Equation (11), if the filter coefficient of the FIR filter for each feedback path illustrated on the right side of FIG. 5 is denoted by $w_i(k)$ and the number of taps is denoted by K−1, and if $K = K_1 + K_2$, and $k = k_1 + k_2$, the FIR filter for each feedback path can be represented by Equation (12) below.

$$u_i(n) = \sum_{k=0}^{K-2} w_i(k) x\left(n - \frac{K}{2} + k\right) \quad (12)$$

The filter coefficient $w_i(k)$ is the sum that satisfies $k = k_1 + k_2$ out of the product of $w_{i,1}(k_1)$ and $w_{i,2}(k_2)$ of the filter coefficient indicated by Equation (11). In other words, for example, the filter coefficients $w_i(0)$ to $w_i(K-2)$ can be obtained as follows.

$$w_i(0) = g_i e^{j\theta_i} \{w_{i,1}(0) w_{i,2}(0)\}$$

$$w_i(1) = g_i e^{j\theta_i} \{w_{i,1}(0) w_{i,2}(1) + w_{i,1}(1) w_{i,2}(0)\}$$

-continued $$w_i(2) = g_i e^{j\theta_i} \{w_{i,1}(0) w_{i,2}(2) + w_{i,1}(1) w_{i,2}(1) + w_{i,1}(2) w_{i,2}(0)\}$$

$$\vdots$$

$$w_i(K-3) = g_i e^{j\theta_i} \{w_{i,1}(K_1-2) w_{i,2}(K_2-1) + w_{i,1}(K_1-1) w_{i,2}(K_2-2)\}$$

$$w_i(K-2) = g_i e^{j\theta_i} \{w_{i,1}(K_1-1) w_{i,2}(K_2-1)\}$$

In this way, it is possible to calculate one path based filter coefficient that is associated with each of the feedback paths and that is associated with the gain, phase, delay, and frequency characteristics exhibited in each of the feedback paths. Accordingly, in the following, a specific example of calculating a batch filter coefficient from the path based filter coefficient for each feedback path will be described. If the path based filter coefficient is calculated, the batch filter coefficient is calculated by the filter coefficient calculation unit 125.

Figure 6:
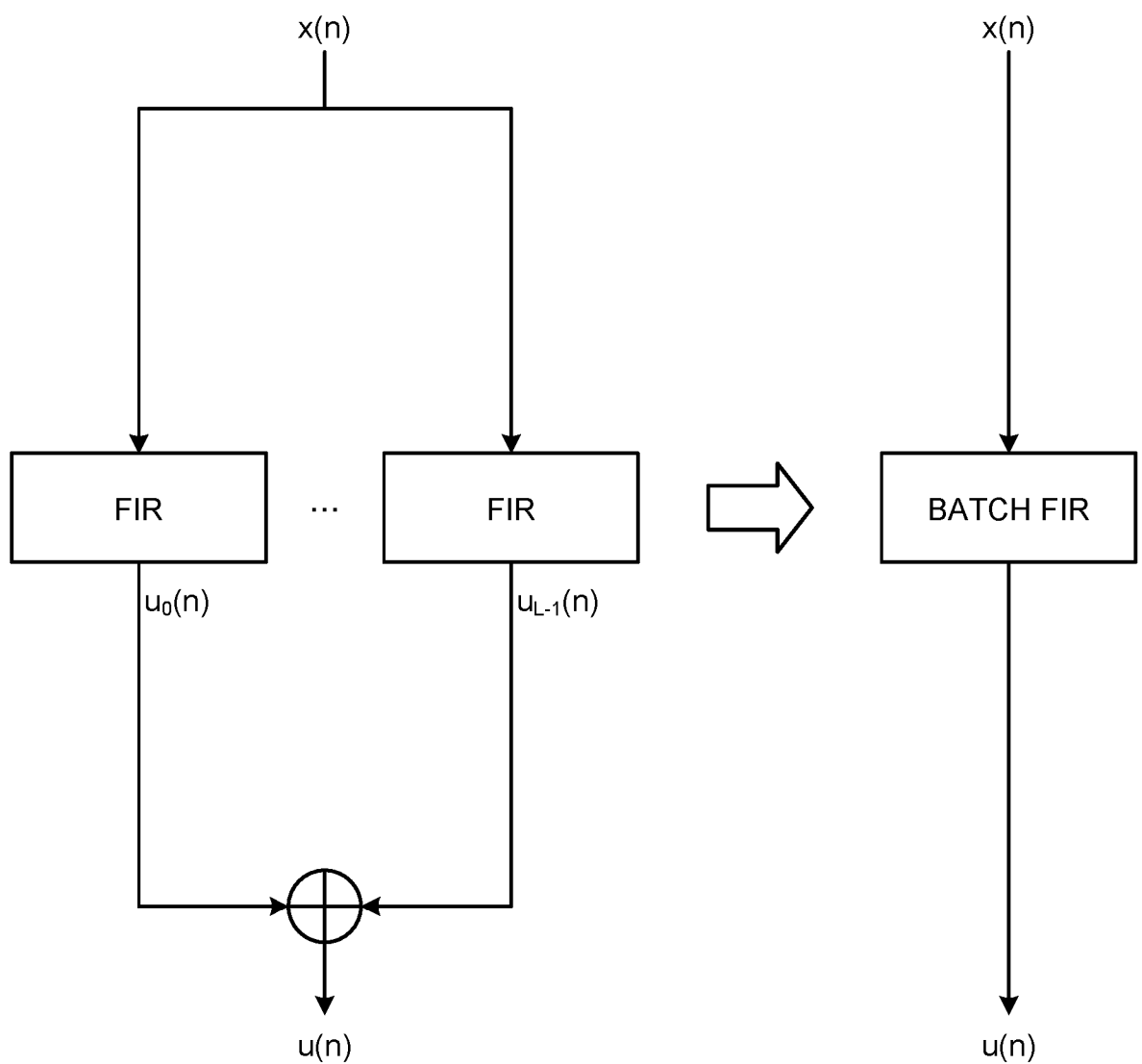
FIG. 6 is a diagram illustrating calculation of a batch filter coefficient.

As illustrated in FIG. 6, the batch filter coefficient is the filter coefficient of the batch FIR filter obtained by integrating the FIR filters associated with the L feedback paths between the path 0 and path (L−1). Here, a case in which a batch filter coefficient that can be used to obtain the signal u(n) equal to the signal obtained by combining the transmission signal x(n) passing through the FIR filter for each feedback path is calculated is considered.

As illustrated on the left side of FIG. 6, the FIR filter in which the path based filter coefficient is set generates, from the transmission signal x(n), a signal $u_i(n)$ in which the analog characteristic exhibited in each of the feedback paths is added. If the path based filter coefficient of the FIR filter of the path i is denoted by $w_i(k)$ and the number of taps of the FIR filter is denoted by K, the output signal $u_i(n)$ of the FIR filter associated with the path i can be represented by Equation (13) below.

$$u_i(n) = \sum_{k=0}^{K-1} w_i(k) x\left(n - \frac{K}{2} + k\right) \quad (13)$$

The batch FIR filter illustrated on the right side of FIG. 6 is obtained by integrating the FIR filters associated with the respective feedback paths, so that the output signal u(n) of the batch FIR filter can be represented by Equation (14) below.

$$u(n) = \sum_{i=0}^{L-1} u_i(n) \quad (14)$$

$$= \sum_{i=0}^{L-1}\sum_{k=0}^{K-1} w_i(k) x\left(n - \frac{K}{2} + k\right)$$

$$= \sum_{k=0}^{K-1} \left\{\sum_{i=0}^{L-1} w_i(k)\right\} x\left(n - \frac{K}{2} + k\right)$$

$$= \sum_{k=0}^{K-1} w(k) x\left(n - \frac{K}{2} + k\right)$$

In Equation (14), the filter coefficient w(k) of the batch FIR filter is the sum of the filter coefficient $w_i(k)$ of the FIR filter associated with each of the feedback paths, and is represented by Equation (15) below.

$$w(k) = \sum_{i=0}^{L-1} w_i(k) \quad (15)$$

The filter coefficient w(k) of this batch FIR filter is the batch filter coefficient for generating the signal u(n) from the transmission signal x(n). The batch filter coefficient calculated in this way is notified from the filter coefficient calculation unit 125 to the variation correction unit 123, and is set in the FIR filter included in the variation correction unit 123. As a result, if the transmission signal is input to the variation correction unit 123, it is possible to add the same characteristics as the analog characteristics exhibited in the respective plurality of feedback paths to the transmission signals, and it is possible to cancel out the effect of the variations in the analog characteristics added to the FB signals.

As described above, according to the present embodiment, the analog characteristics exhibited in the respective plurality of feedback paths are estimated, the batch filter coefficient for correcting these analog characteristics are calculated, the variations in the analog characteristics exhibited in the respective feedback paths are collectively corrected by using one filter. As a result, it is possible to correct the variations in the analog characteristics by operating the multipliers associated with one filter, and it is thus possible to accurately update the distortion compensation coefficients. As a result, it is possible to prevent a decrease in distortion compensation performance while suppressing an increase in electrical power consumption.

[b] Second Embodiment

The characteristic of the second embodiment is that correction is performed on the FB signal regarding an average amount of the analog characteristics exhibited in the respective plurality of feedback paths, whereas correction is performed on the transmission signal regarding a variation amount of the remaining analog characteristics.

The configuration of the communication system according to the second embodiment is the same as that of the first embodiment (see FIG. 1); therefore, the descriptions thereof will be omitted. In the second embodiment, the configuration of the processor 120 included in the RU 100 is different from that described in the first embodiment (see FIG. 2).

Figure 7:
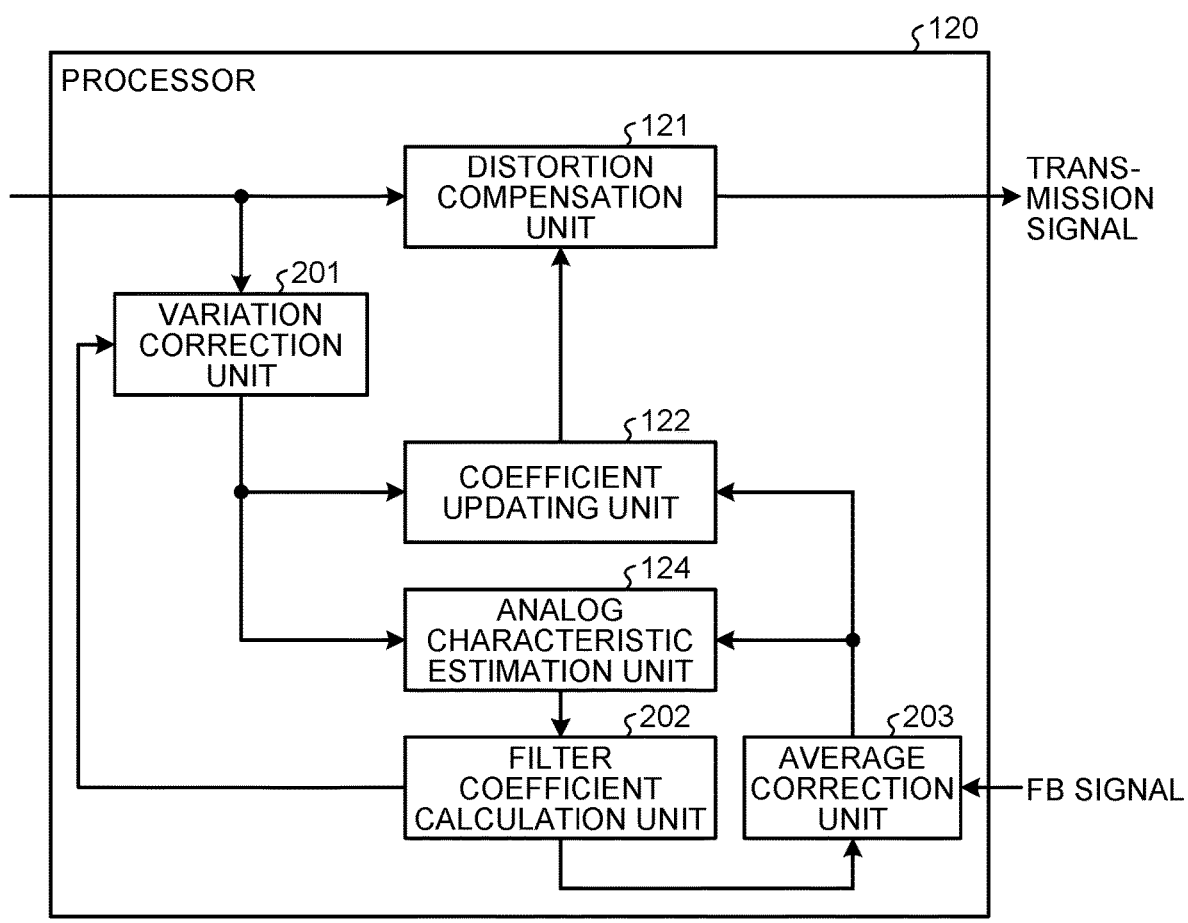
FIG. 7 is a block diagram illustrating a configuration of a processor according to a second embodiment.

FIG. 7 is a block diagram illustrating the configuration of the processor 120 according to the second embodiment. In FIG. 7, components that are the same as those illustrated in FIG. 2 are assigned the same reference numerals and descriptions thereof will be omitted. The processor 120 illustrated in FIG. 7 includes a variation correction unit 201, a filter coefficient calculation unit 202, and an average correction unit 203, instead of the variation correction unit 123 and the filter coefficient calculation unit 125 included in the processor 120 illustrated in FIG. 2.

The variation correction unit 201 corrects the variations in the analog characteristics exhibited in the respective feedback paths received from the respective plurality of antenna elements. Specifically, the variation correction unit 201 includes, for example, an FIR filter, sets a batch filter coefficient in the FIR filter, and allows the transmission signal to pass the FIR filter. The FIR filter included in the variation correction unit 201 adds, to the transmission signal, the characteristic corresponding to the variation amount excluding the average amount of the analog characteristics exhibited in the respective plurality of feedback paths. As a result, the variation amount of the analog characteristic, which has been added to the FB signals passing through different feedback paths, is added to the transmission signal that is input to the coefficient updating unit 122, so that it is possible to correct the variations in the analog characteristics. Furthermore, the variation correction unit 201 collectively corrects the variations in the analog characteristics by using one FIR filter, so that it is possible to minimize the number of multipliers that are used for the correction, and it is thus possible to suppress an increase in electrical power consumption.

The filter coefficient calculation unit 202 calculates, on the basis of the analog characteristic for each feedback path, the batch filter coefficient that is set in the variation correction unit 201 and the filter coefficient that is set in the average correction unit 203. Specifically, the filter coefficient calculation unit 202 calculates, from the gain, phase, delay, and frequency characteristics exhibited in the respective feedback paths, the average amount of the analog characteristics exhibited in the plurality of feedback paths and the amount variation that is a remaining amount obtained by subtracting the average amount of the analog characteristics. In other words, the filter coefficient calculation unit 202 calculates a correction value corresponding to the average amount of the analog characteristics that is used to perform correction on the FB signal, and the path based filter coefficient corresponding to the variation amount of the remaining analog characteristics that is used to perform correction on the transmission signal. Then, the filter coefficient calculation unit 202 notifies the average correction unit 203 of the correction value corresponding to the average amount, and notifies the variation correction unit 201 of the batch filter coefficient that is calculated from the path based filter coefficient.

The average correction unit 203 removes, from the FB signal, the average amount of the analog characteristics exhibited in the respective plurality of feedback paths. In other words, the average correction unit 203 acquires, from the filter coefficient calculation unit 202, the correction value corresponding to the average amount of the gain, phase, delay, and frequency characteristics exhibited in the respective plurality of feedback paths, and performs correction related to the average amount of the analog characteristics on the FB signal.

Figure 8:
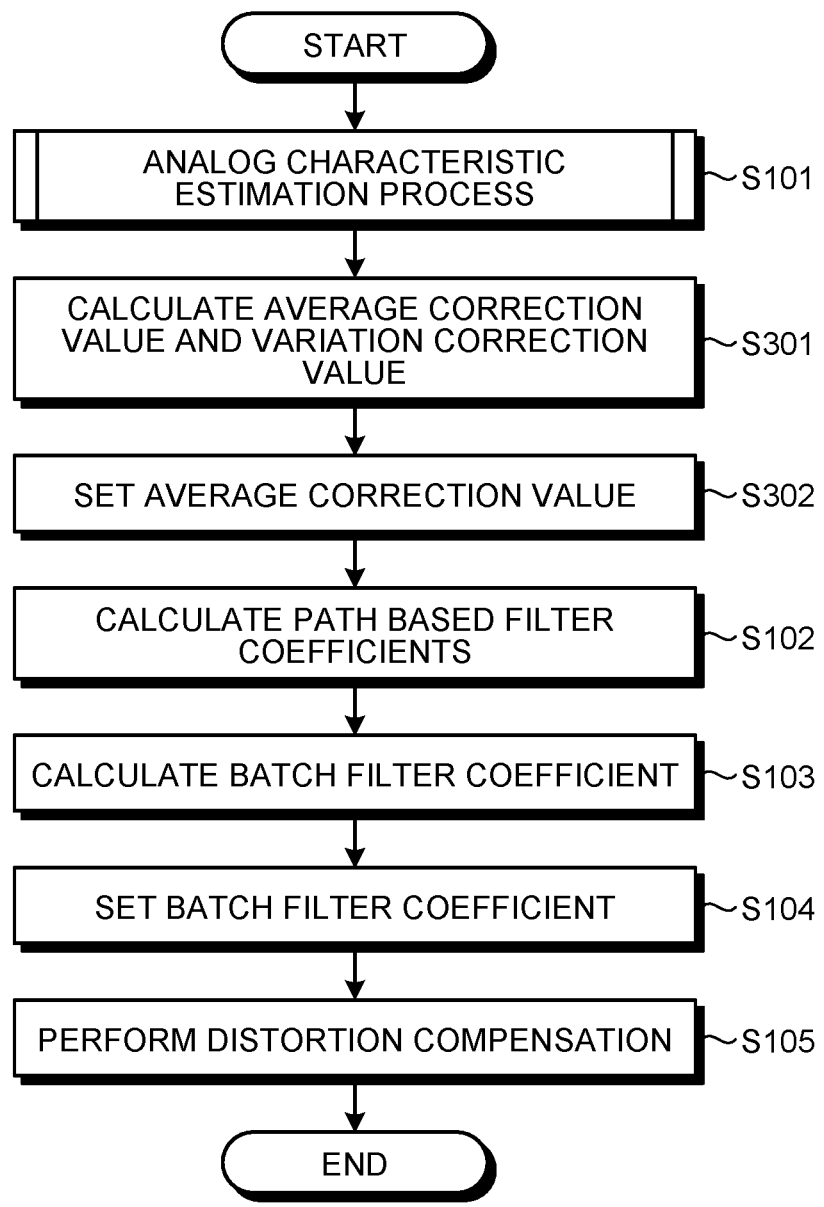
FIG. 8 is a flowchart illustrating a distortion compensation method according to the second embodiment.

In the following, a distortion compensation method performed by the RU 100 having configuration described above will be described with reference to the flowchart illustrated in FIG. 8. In FIG. 8, processes that are the same as those illustrated in FIG. 3 are assigned the same reference numerals and descriptions thereof will be omitted.

In a predetermined time period, such as at the time of startup of the RU 100 or update of the filter coefficient that is performed in a predetermined cycle, a process for setting a batch filter coefficient in the variation correction unit 201 and a process for setting a correction value in the average correction unit 203 are performed. The transmission baseband signal transmitted from the CU/DU 10 during this time period is received by the communication I/F unit 110 and is input to the processor 120. Then, the transmission signal passes through the variation correction unit 201 and is input to the analog characteristic estimation unit 124.

Furthermore, after the transmission signal is subjected to distortion compensation by the distortion compensation unit 121 and is subjected to D/A conversion and up-conversion, an antenna weight for beamforming is added to the transmission signal by the phase shifter 150, and the transmission signal is amplified by the power amplifier 160 and is then transmitted to the wireless space. At this time, the signal that has been amplified by the power amplifier 160 is fed back to the phase shifter 170, is subjected to down-conversion and A/D conversion, and is then input to the analog characteristic estimation unit 124 as the FB signal.

In the analog characteristic estimation unit 124 in which the transmission signal and the FB signal are input, a process for estimating the analog characteristics exhibited in the respective feedback paths is performed by using the transmission signal and the FB signal (Step S101).

If the analog characteristics respective in the respective feedback paths are estimated, a correction value (hereinafter, referred to as an "average correction value") that indicates the average amount equal of the analog characteristics exhibited in the respective feedback paths and the variation amount of the remaining analog characteristics excluding the average amount are calculated by the filter coefficient calculation unit 202 (Step S301).

Specifically, first, if the amplitude gain estimated for each feedback path is denoted by $g_i$, an average amplitude gain $g_{ave}$ of all of the paths is represented by Equation (16) below.

$$g_{ave} = \frac{1}{L}\sum_{i=0}^{L-1} g_i \tag{16}$$

The average correction value related to the gain is a reciprocal of the average amplitude gain $g_{ave}$, so that an average correction value $g_{ave}$ related to the gain is represented by Equation (17) below.

$$g'_{ave} = \frac{1}{g_{ave}} \times \frac{1}{L} = \frac{1}{\sum_{i=0}^{L-1} g_i} \tag{17}$$

Furthermore, $g'_i$ that denotes the variation amount that is the remaining amount excluding the average amount of the analog characteristics related to the gain is represented by Equation (18) below.

$$g'_i = \frac{g_i}{g_{ave}} \times \frac{1}{L} = \frac{g_i}{\sum_{i=0}^{L-1} g_i} \tag{18}$$

Furthermore, in Equations (17) and (18), the reason for multiplying each of the average correction value and the variation amount by 1/L is to normalize, when the FB signals associated with the respective L feedback paths are combined, an amount of amplitude that is increased by a factor of L.

Then, if the coefficient set of the delay FIR filter estimated for each feedback path is denoted by $p_i$, an average delay $p_{ave}$ of all of the paths can be represented by Equation (19) below.

$$p_{ave} = \frac{1}{L}\sum_{i=0}^{L-1} p_i \tag{19}$$

If the total number of the coefficient set of the delay FIR filter is denoted by $S_1$, an average correction value $p_{ave}$ related to a delay is represented by Equation (20) below.

$$p'_{ave} = S_i - p_{ave} = S_i - \frac{1}{L}\sum_{i=0}^{L-1} p_i \tag{20}$$

Furthermore, a variation amount $p'_i$ that is a remaining amount excluding the average amount related to the delay is represented by Equation (21) below.

$$p'_i = p_i - p_{ave} + \frac{S_1}{2} = p_i - \frac{1}{L}\sum_{i=0}^{L-1} p_i + \frac{S_1}{2} \tag{21}$$

Then, if the phase that has been estimated for each feedback path is denoted by $\theta_i$, an average phase $\theta_{ave}$ of all of the paths is represented by Equation (22) below.

$$\theta_{ave} = \frac{1}{L}\sum_{i=0}^{L-1} \theta_i \tag{22}$$

The average correction value related to the phase is a value obtained by multiplying the average phase $\theta_{ave}$ by (−1), so that an average correction value $\theta_{ave}$ related to the phase is represented by Equation (23) below.

$$\theta'_{ave} = (-1) \times \theta_{ave} = (-1) \times \frac{1}{L}\sum_{i=0}^{L-1} \theta_i \tag{23}$$

Furthermore, a variation amount $\theta'_i$ that is a remaining amount excluding the average amount related to the phase is represented by Equation (24) below.

$$\theta'_i = \theta_i - \theta_{ave} = \theta_i - \frac{1}{L}\sum_{i=0}^{L-1} \theta_i \tag{24}$$

Then, if the coefficient set of the frequency characteristic FIR filter estimated for each feedback path is denoted by $q_i$, an average frequency characteristic $q_{ave}$ of all of the paths is represented by Equation (25) below.

$$q_{ave} = \frac{1}{L}\sum_{i=0}^{L-1} q_i \tag{25}$$

If the total number of the coefficient sets of the frequency characteristic FIR filters is denoted by $S_2$, an average correction value $q_{ave}$ related to the frequency characteristic is represented by Equation (26) below.

$$q'_{ave} = S_2 - q_{ave} = S_2 - \frac{1}{L}\sum_{i=0}^{L-1} q_i \tag{26}$$

Furthermore, a remaining variation amount $q'_i$ that is a remaining amount excluding the average amount related to the frequency characteristic is represented by Equation (27) below.

$$q'_i = q_i - q_{ave} + \frac{S_2}{2} = q_i - \frac{1}{L}\sum_{i=0}^{L-1} q_i + \frac{S_2}{2} \qquad (27)$$

The average correction value of the gain, delay, phase, and frequency characteristics calculated in this way is set in the average correction unit 203 (Step S302). As a result, it is possible to correct the average amount of the analog characteristics exhibited in the respective plurality of feedback paths by performing correction on the FB signal by the average correction unit 203.

In contrast, similarly to the first embodiment, the variation amount of the gain, delay, phase, and frequency characteristics is used to calculate the path based filter coefficient. In other words, the path based filter coefficient associated with the variation amount of the analog characteristics exhibited in the respective feedback paths is calculated by the filter coefficient calculation unit 202 (Step S102). Then, the batch filter coefficient is calculated by obtaining the sum of the path based filter coefficients by the filter coefficient calculation unit 202 (Step S103).

The batch filter coefficient is notified to the variation correction unit 201 and is set in the FIR filter included in the variation correction unit 201 (Step S104). As a result, a setting process performed in a predetermined time period, such as at the time of startup of the RU 100 or update of the filter coefficient, has been completed. When the batch filter coefficient is set in the variation correction unit 201, the usual signal transmission process is performed after this. In other words, after the transmission signal is subjected to distortion compensation by the distortion compensation unit 121 (Step S105) and is subjected to D/A conversion and up-conversion, the antenna weight for beamforming is added to the transmission signal by the phase shifter 150, and the transmission signal is amplified by the power amplifier 160 and is then transmitted to the wireless space.

Furthermore, the signals that have been amplified by the respective power amplifiers 160 associated with the respective antenna elements are fed back via the respective feedback paths and are combined after an inverse weight is added to each of the signals by the phase shifter 170. The combined FB signal is input to the coefficient updating unit 122 after having been corrected by using the average correction value performed by the average correction unit 203. In contrast, the same characteristics as the analog characteristics that correspond to the variation amount and that are exhibited in the respective feedback paths are collectively added to the transmission signal that has not been subjected to the distortion compensation by the variation correction unit 201, and the corrected transmission signal is input to the coefficient updating unit 122. Then, the distortion compensation coefficient that is used by the distortion compensation unit 121 is updated by the coefficient updating unit 122 by using the transmission signal and the FB signal.

At the time of update of the distortion compensation coefficient, the FB signal obtained by combining the signals each passing through a different feedback path and the transmission signal are used; however, correction has been performed on the transmission signal and the FB signal, so that it is possible to reduce the effect of variations in the analog characteristics. As a result, it is possible to improve the accuracy of the distortion compensation coefficient, and prevent a decrease in distortion compensation performance. Furthermore, when the same characteristics as the analog characteristics that correspond to the variation amount and that are exhibited in the respective feedback paths are added to the transmission signal, only one FIR filter included in the variation correction unit 201 is operated, it is thus possible to suppress an increase in electrical power consumption.

As described above, according to the present embodiment, the analog characteristics exhibited in the respective plurality of feedback paths are estimated; the correction value of the average amount of the analog characteristics and the variation amount are calculated; regarding the average amount, the FB signal is corrected; and, regarding the variation amount, the transmission signal is collectively corrected by using one filter. As a result, it is possible to correct the variations in the analog characteristics by operating the multipliers included in one filter, and it is thus possible to accurately update the distortion compensation coefficients. As a result, it is possible to prevent a decrease in distortion compensation performance while suppressing an increase in electrical power consumption.

[c] Third Embodiment

The characteristic of the third embodiment is that calibration is performed on the phase shifter provided on a transmission path and the phase shifter on the feedback path.

The configuration of the communication system according to the third embodiment is the same as that of the first embodiment (see FIG. 1); therefore, the descriptions thereof will be omitted. In the third embodiment, the configuration of the RU 100 is different from that described in the first embodiment (see FIG. 2).

Figure 9:
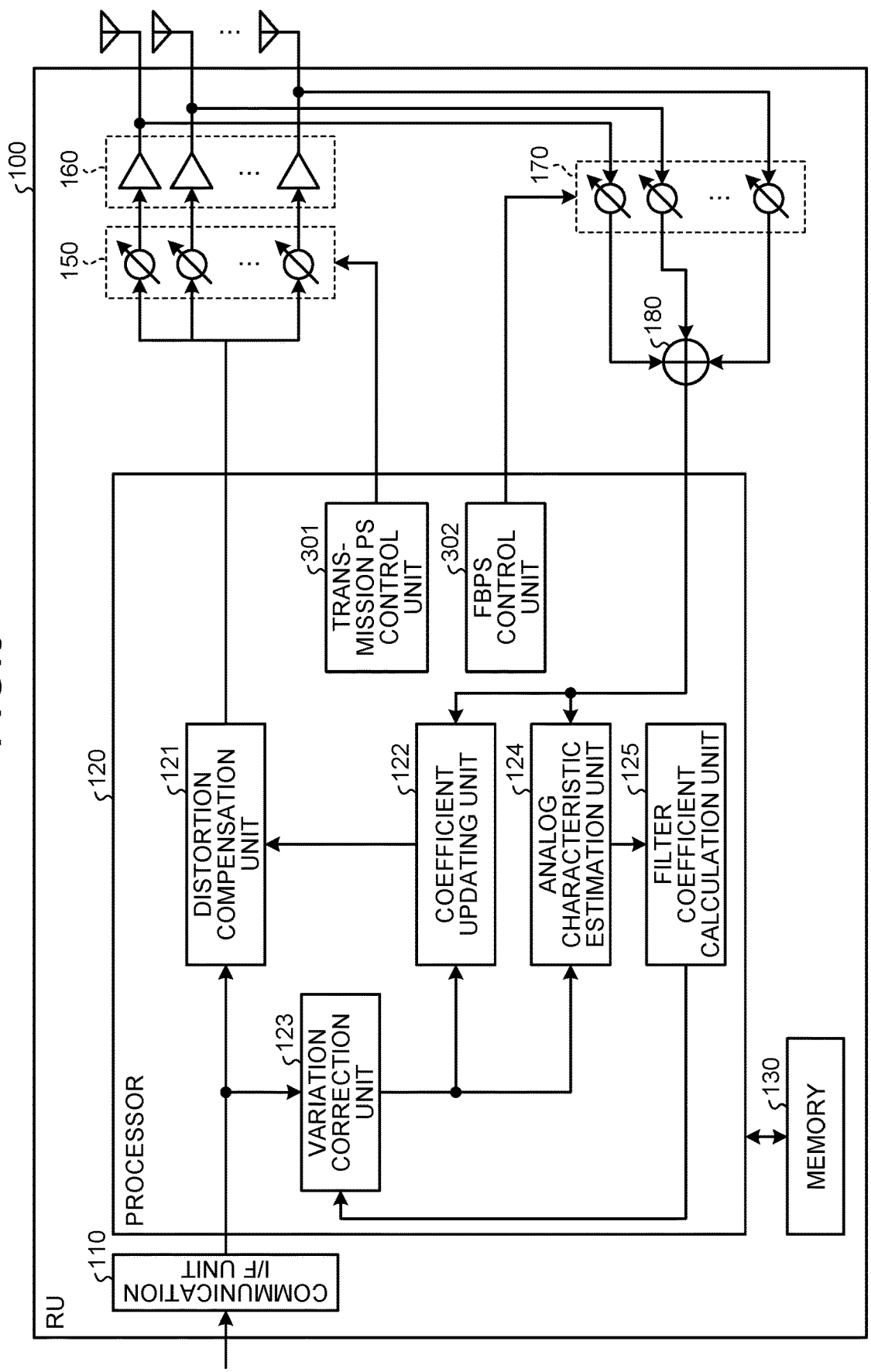
FIG. 9 is a block diagram illustrating a configuration of an RU according to a third embodiment.

FIG. 9 is a block diagram illustrating the configuration of the RU 100 according to the third embodiment. In FIG. 9, components that are the same as those illustrated in FIG. 2 are assigned the same reference numerals and descriptions thereof will be omitted. The RU 100 illustrated in FIG. 9 has a configuration in which a transmission phase shifter (PS) control unit 301 and a feedback (FB) phase shifter (PS) control unit 302 are added to the RU 100 illustrated in FIG. 2.

The transmission PS control unit 301 performs calibration on the phase shifter 150 provided on the transmission path. In other words, the transmission PS control unit 301 controls the gain and the phase of the phase shifter 150. Specifically, the transmission PS control unit 301 controls the gain of the phase shifter 150 such that the power of the signals received by the predetermined UE 20 is the same by turning on a transmission path one by one out of the L transmission paths for transmission performed via the phase shifter 150. Then, the transmission PS control unit 301 controls the phase of the phase shifter 150 such that the power of the signals received by the predetermined UE 20 is the maximum by turning on the transmission paths two by two out of the L transmission paths for transmission performed via the phase shifter 150.

The transmission PS control unit 301 repeatedly performs the control of the gain and the phase described above on all of the transmission paths. Furthermore, the transmission PS control unit 301 may adjust the gain of the phase shifter 150 such that the power of the signals received by the predetermined UE 20 is the same when the transmission PS control unit 301 controls the phase and then again turns on the transmission path one by one out of the L transmission paths for the transmission performed via the phase shifter 150.

The FBPS control unit 302 performs calibration on the phase shifter 170 provided on the feedback path. In other words, the FBPS control unit 302 controls the gain and the phase of the phase shifter 170. Specifically, the FBPS control unit 302 controls the gain of the phase shifter 170 such that the power of the FB signals is the same by turning on a feedback path one by one out of the L feedback paths for the transmission performed via the phase shifter 170. Then, the FBPS control unit 302 controls the phase of the phase shifter 170 such that the power of the FB signal is the maximum by turning on the feedback paths two by two out of the L feedback paths for the transmission performed via the phase shifter 170.

The FBPS control unit 302 repeatedly performs the control of the gain and the phase described above on all of the feedback paths. Furthermore, the FBPS control unit 302 may adjust the gain of the phase shifter 170 such that the power of the FB signals is the same when the FBPS control unit 302 controls the phase and then again turns on the feedback path one by one out of the L feedback paths for the transmission performed via the phase shifter 170.

In the present embodiment, in a predetermined time period, such as at the time of startup of the RU 100 or update of the filter coefficient that is performed in a predetermined cycle, after calibration has been performed on the phase shifter 150 and the phase shifter 170, the analog characteristics exhibited in the respective plurality of feedback paths are estimated. Then, similarly to the first embodiment, the path based filter coefficient and the batch filter coefficient are calculated on the basis of the estimated analog characteristics. As a result, it is possible to further correct the variations in the analog characteristics after having made the analog characteristics exhibited in the respective plurality of feedback paths uniform, and it is thus possible to improve the accuracy of the transmission signal and the FB signal used for the update of the distortion compensation coefficient.

As described above, according to the present embodiment, the variations in the analog characteristics exhibited in the respective plurality of feedback paths are corrected after calibration has been performed on the phase shifters that are provided on the transmission paths and the feedback paths. As a result, it is possible to more accurately update the distortion compensation coefficient, and it is thus possible to prevent a decrease in distortion compensation performance.

[d] Fourth Embodiment

The characteristic of the fourth embodiment is that a path based filter coefficient associated with each of the plurality of feedback paths is derived by using a convergence algorithm.

The configuration of a communication system according to a fourth embodiment is the same as that described in the first embodiment (see FIG. 1); therefore, the descriptions thereof will be omitted. In the fourth embodiment, the configuration of the RU 100 is different from that in the first embodiment (see FIG. 2).

Figure 10:
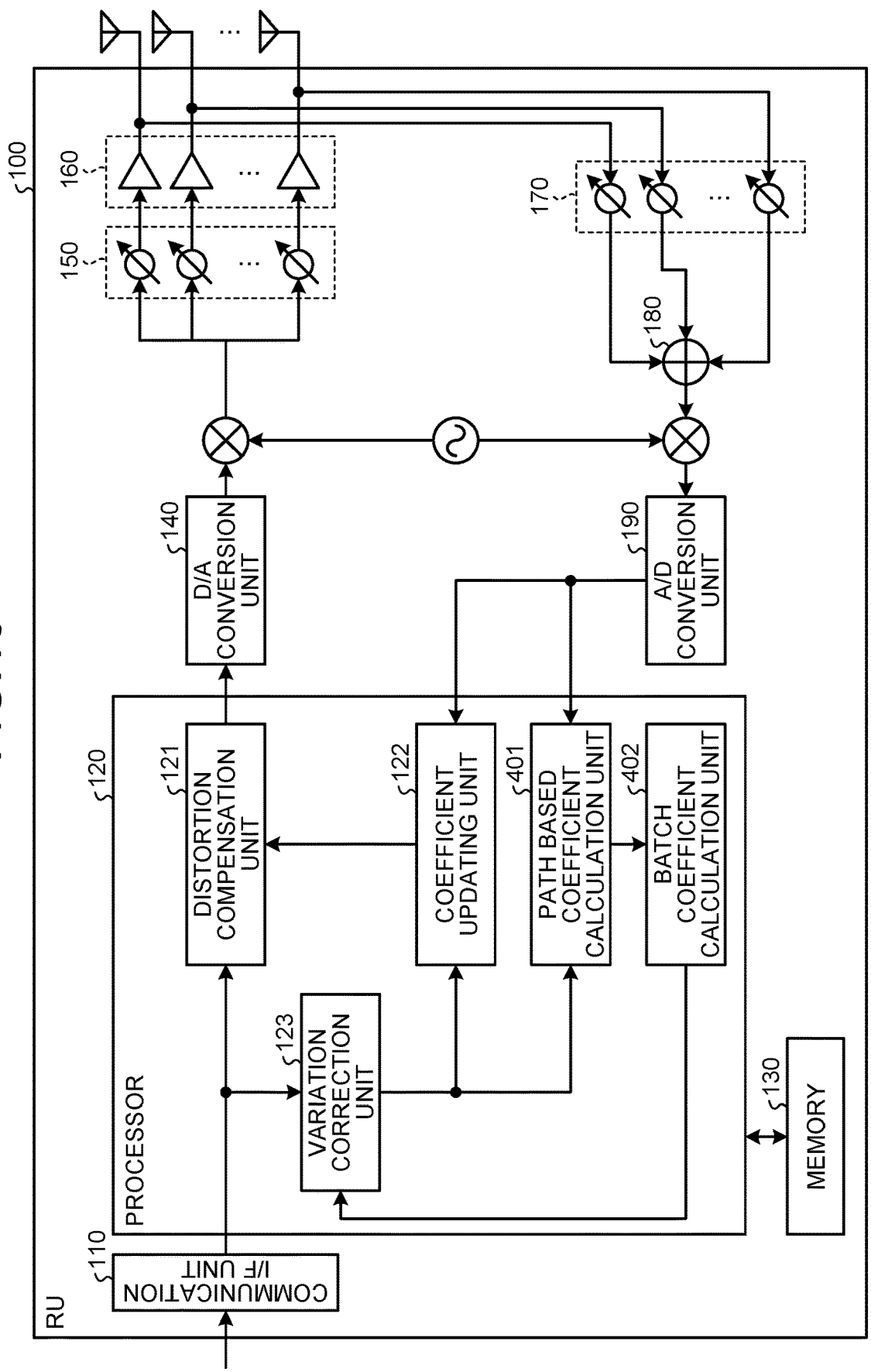
FIG. 10 is a block diagram illustrating a configuration of an RU according to a fourth embodiment.

FIG. 10 is a block diagram illustrating the configuration of the RU 100 according to the fourth embodiment. In FIG. 10, components that are the same as those illustrated in FIG. 2 are assigned the same reference numerals and descriptions thereof will be omitted. The RU 100 illustrated in FIG. 10 includes a path based coefficient calculation unit 401 and a batch coefficient calculation unit 402, instead of the analog characteristic estimation unit 124 and the filter coefficient calculation unit 125, respectively, included in the RU 100 illustrated in FIG. 2.

Figure 11:
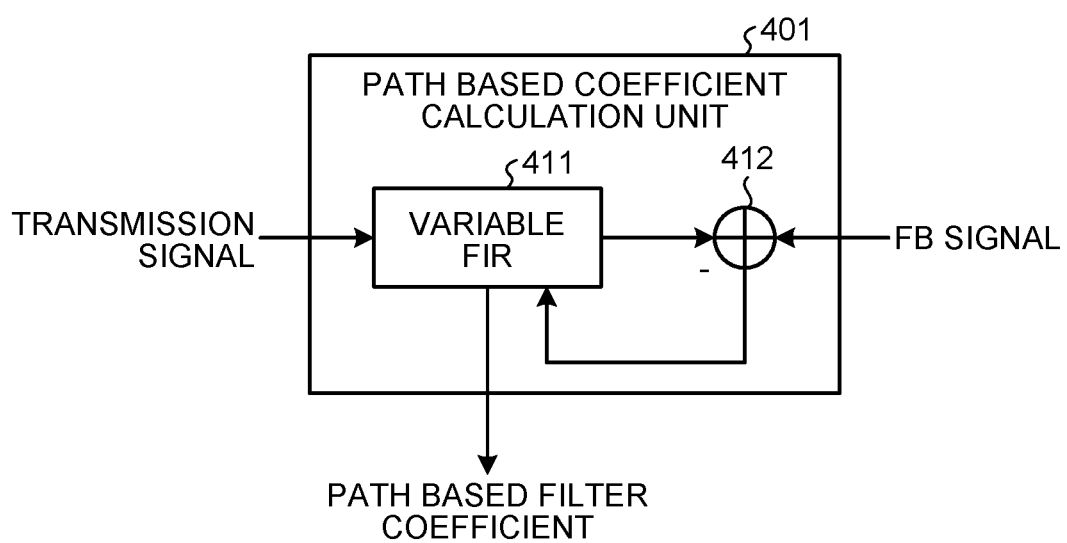
FIG. 11 is a diagram illustrating a configuration example of a path based coefficient calculation unit.

The path based coefficient calculation unit 401 calculates, by using a convergence algorithm, such as a LMS algorithm, the path based filter coefficient associated with the analog characteristics exhibited in the respective plurality of feedback paths. Specifically, the path based coefficient calculation unit 401 has the configuration illustrated in, for example, FIG. 11. As illustrated in FIG. 11, the path based coefficient calculation unit 401 includes a variable FIR 411 and an error calculation unit 412.

The variable FIR 411 is an FIR filter that is able to change a filter coefficient and that performs filtering on the transmission signal and outputs the filtered transmission signal to the error calculation unit 412. At this time, the variable FIR 411 performs filtering on the transmission signal while changing the filter coefficient such that an error calculated by the error calculation unit 412 is reduced. Then, the variable FIR 411 outputs, to the batch coefficient calculation unit 402, the filter coefficient in which the error is the minimum as a path based filter coefficient.

The error calculation unit 412 calculates an error between the transmission signal that is output from the variable FIR 411 and the FB signal. If the same characteristic as the analog characteristics added to the FB signals in the feedback path is added to the transmission signal by the filtering performed by the variable FIR 411, the error calculated by the error calculation unit 412 approaches zero.

With this configuration, the path based coefficient calculation unit 401 outputs, to the batch coefficient calculation unit 402 for each feedback path, the path based filter coefficient that minimizes the error between the transmission signal and the FB signal.

A description will be given here by referring back to FIG. 10. The batch coefficient calculation unit 402 calculates the batch filter coefficient by obtaining the sum of the path based filter coefficients for each feedback path. The batch coefficient calculation unit 402 notifies the variation correction unit 123 of the calculated batch filter coefficient.

Figure 12:
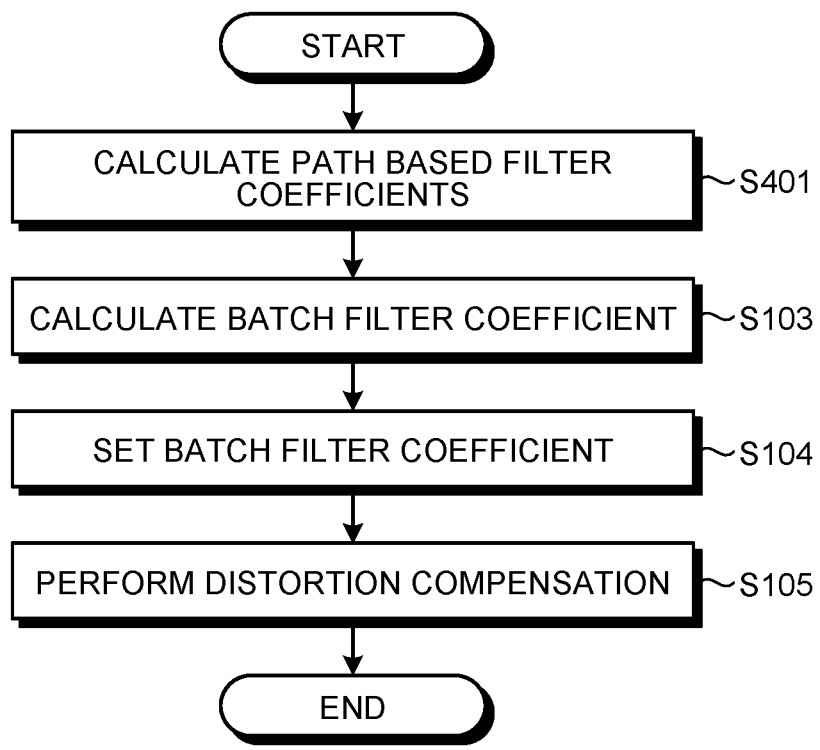
FIG. 12 is a flowchart illustrating a distortion compensation method according to a fourth embodiment.

In the following, a distortion compensation method performed by the RU 100 having the configuration described above will be described with reference to flowchart illustrated in FIG. 12. In FIG. 12, processes that are the same as those illustrated in FIG. 3 are assigned the same reference numerals and descriptions thereof in detail will be omitted.

In a predetermined time period, such as at the time of startup of the RU 100 or update of the filter coefficient that is performed in a predetermined cycle, a process for setting a batch filter coefficient in the variation correction unit 201 is performed. The transmission baseband signal transmitted from the CU/DU 10 during this time period is received by the communication I/F unit 110 and is input to the processor 120. Then, the transmission signal passes through the variation correction unit 123 and is then input to the path based coefficient calculation unit 401.

Furthermore, after the transmission signal is subjected to distortion compensation by the distortion compensation unit 121 and is subjected to D/A conversion and up-conversion, an antenna weight for beamforming is added to the transmission signal by the phase shifter 150, and the transmission signal is amplified by the power amplifier 160 and is then transmitted to the wireless space. At this time, the signal amplified by the power amplifier 160 is fed back to the phase shifter 170, is subjected to down-conversion and A/D conversion, and is input to the path based coefficient calculation unit 401 as the FB signal.

In the path based coefficient calculation unit 401 in which the transmission signal and the FB signal are input, a path based filter coefficient for each feedback path is calculated by using the transmission signal and the FB signal (Step S401). Specifically, as a result of adjusting the gain of the phase shifter 170, the FB signal for each feedback path is input to the path based coefficient calculation unit 401, and the error between the transmission signal that has passed through the variable FIR 411 and the FB signal is calculated by the error calculation unit 412.

Here, a transmission signal y'(n) obtained from a transmission signal x(n) that is input to the variable FIR 411 and is subjected to filtering by the variable FIR 411 is represented by Equation (28) below.

$$y'(n) = \sum_{k=0}^{K-1} w(k) x\left(n - \frac{K}{2} + k\right) \quad (28)$$

In Equation (28), w(k) denotes a filter coefficient of the variable FIR 411, and K denotes the number of taps of the variable FIR 411. The transmission signal y'(n) obtained in this way is output from the variable FIR 411, so that an error e(n) between the transmission signal y'(n) and the FB signal y(n) is calculated by the error calculation unit 412 in a manner represented by Equation (29) below.

$$e(n) = y(n) - y'(n) \quad (29)$$

The calculated error e(n) is fed back to the variable FIR 411, and a filter coefficient w(k) of the variable FIR 411 is updated such that the error e(n) is reduced. In other words, the filter coefficient w(k) is updated by using Equation (30) below.

$$w(k) = w(k) + \mu \times e(n) \times \left\{ x\left(n - \frac{K}{2} + k\right) \right\}^* \quad (30)$$

where, in Equation (30), μ denotes a step size parameter, and x* denotes a complex conjugate of x. In this way, a process for updating the filter coefficient of the variable FIR 411 is repeated such that the error is reduced, the filter coefficient associated with the minimum error is specified as the path based filter coefficient. The calculation of the path based filter coefficient is repeatedly performed on all of the feedback paths, and the path based filter coefficient related to each of the feedback path is output to the batch coefficient calculation unit 402.

Then, the batch filter coefficient is calculated by obtaining the sum of the path based filter coefficients by the batch coefficient calculation unit 402 (Step S103). The batch filter coefficient is notified to the variation correction unit 123 and is set in the FIR filter included in the variation correction unit 123 (Step S104). As a result, the setting process performed in the predetermined time period, such as at the time of startup of the RU 100 or update of the filter coefficient, has been completed. When the batch filter coefficient is set in the variation correction unit 123, the usual signal transmission process is performed after this. In other words, the transmission signal is subjected to distortion compensation by the distortion compensation unit 121 (Step S105) and is subjected to D/A conversion and up-conversion, an antenna weight for beamforming is added to the transmission signal by the phase shifter 150, and the transmission signal is amplified by the power amplifier 160 and is then transmitted to the wireless space.

Furthermore, the signals that have been amplified by the respective power amplifiers 160 associated with the respective antenna elements are fed back via the respective feedback paths and are combined after an inverse weight is added to each of the signals by the phase shifter 170. The combined FB signal is input to the coefficient updating unit 122. In contrast, the same characteristics as the analog characteristics exhibited in the respective feedback paths are collectively added to the transmission signal that has not been subjected to distortion compensation by the variation correction unit 123, and the corrected transmission signal is input to the coefficient updating unit 122. Then, the distortion compensation coefficient that is used by the distortion compensation unit 121 is updated by the coefficient updating unit 122 by using the transmission signal and the FB signal.

At the time of update of the distortion compensation coefficient, the FB signal obtained by combining the signals each passing through a different feedback path and the transmission signal are used; however, the same characteristics as the analog characteristics exhibited in the respective feedback paths are added to the transmission signal, so that it is possible to reduce the effect of variations in the analog characteristics. As a result, it is possible to improve the accuracy of the distortion compensation coefficient, and prevent a decrease in distortion compensation performance. Furthermore, when the same characteristics as the analog characteristics exhibited in the respective feedback paths are added to the transmission signal, only one FIR filter included in the variation correction unit 123 is operated, it is thus possible to suppress an increase in electrical power consumption.

As described above, according to the present embodiment, the path based filter coefficient associated with the plurality of feedback paths is calculated by using the convergence algorithm, the batch filter coefficient is calculated from the path based filter coefficient, and the variations in the analog characteristics of the feedback paths are collectively corrected by using one filter. As a result, the variations in the analog characteristics are corrected by operating the multipliers included in one filter, and it is thus possible to accurately update the distortion compensation coefficients. As a result, it is possible to prevent a decrease in distortion compensation performance while suppressing an increase in electrical power consumption.

[e] Fifth Embodiment

The characteristic of the fifth embodiment is that the variations in the analog characteristics exhibited in the respective feedback paths are corrected with respect to the FB signal.

A configuration of a communication system according to the fifth embodiment is the same as that described in the first embodiment (see FIG. 1); therefore, the descriptions thereof will be omitted. In the fifth embodiment, the configuration of the processor 120 included in the RU 100 is different from that described in the first embodiment (see FIG. 2).

Figure 13:
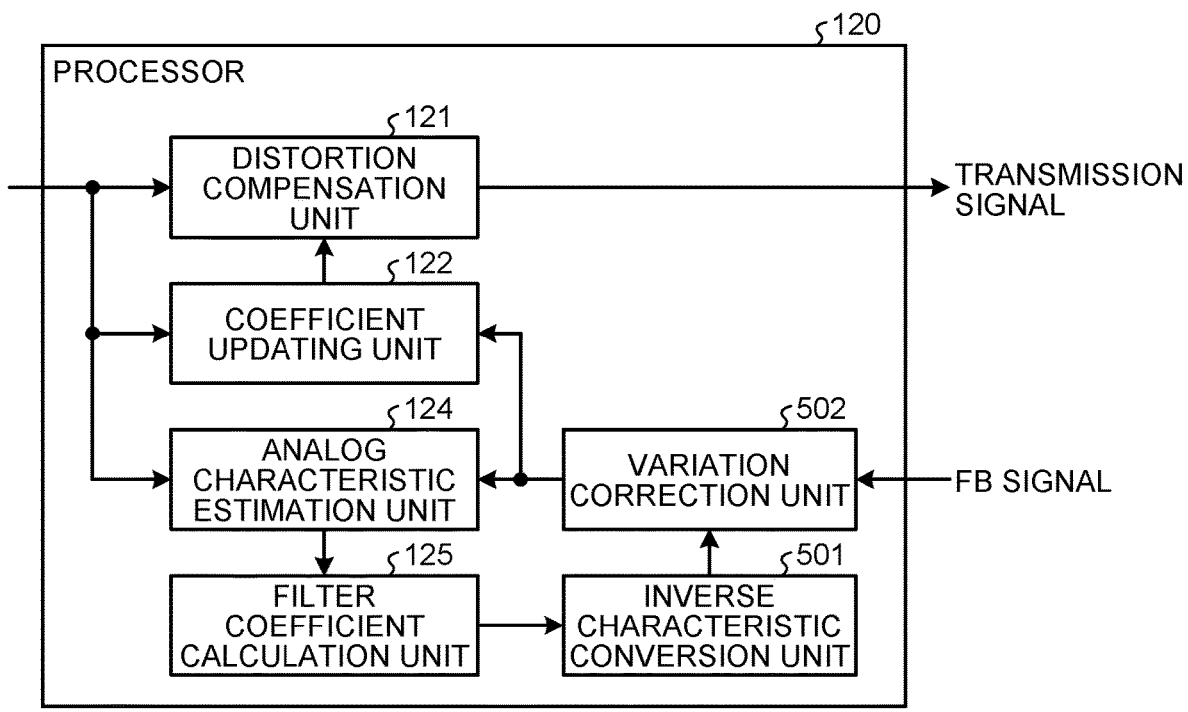
FIG. 13 is a block diagram illustrating a configuration of a processor according to a fifth embodiment.

FIG. 13 is a block diagram illustrating the configuration of the processor 120 according to the fifth embodiment. In FIG. 13, components that are the same as those illustrated in FIG. 2 are assigned the same reference numerals and descriptions thereof will be omitted. The processor 120 illustrated in FIG. 13 includes an inverse characteristic conversion unit 501 and a variation correction unit 502, instead of the variation correction unit 123 included in the processor 120 illustrated in FIG. 2.

The inverse characteristic conversion unit 501 converts the batch filter coefficient calculated by the filter coefficient calculation unit 125 to the inverse characteristic. Then, the inverse characteristic conversion unit 501 notifies the variation correction unit 502 of the batch filter coefficient that has been converted to the inverse characteristic.

The variation correction unit 502 corrects the variations in the analog characteristics that are exhibited in the respective feedback paths and that are received from the plurality of antenna elements. Specifically, the variation correction unit 502 includes, for example, an FIR filter, sets the batch filter coefficient notified from the inverse characteristic conversion unit 501 in the FIR filter, and allows the FB signal to pass the FIR filter. The FIR filter included in the variation correction unit 502 adds the inverse characteristic of the analog characteristic of the plurality of feedback paths to the FB signal. As a result, in the FB signal that is input to the coefficient updating unit 122, the analog characteristic exhibited in the feedback path is removed, and thus it is possible to correct the variations in the analog characteristics. Furthermore, the variation correction unit 502 collectively corrects the variations in the analog characteristics by using one FIR filter, so that it is possible to minimize the number of multipliers that are used for the correction, and it is thus possible to suppress an increase in electrical power consumption.

Figure 14:
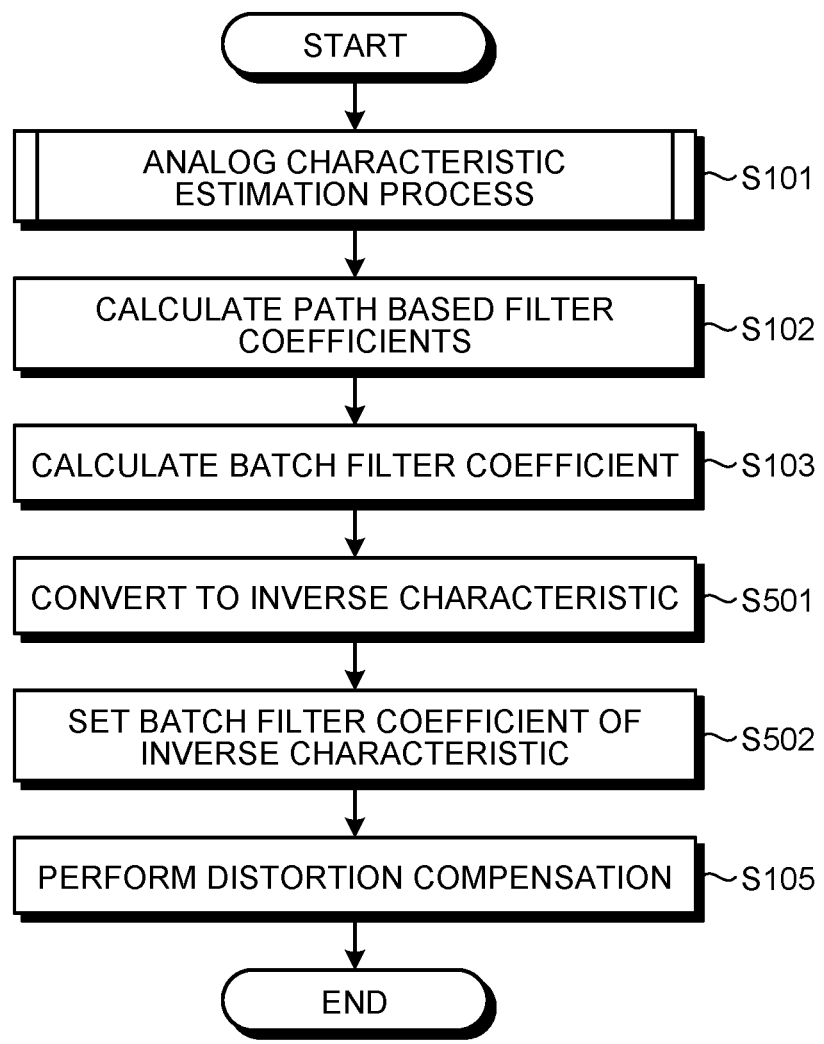
FIG. 14 is a flowchart illustrating a distortion compensation method according to the fifth embodiment.

In the following, a distortion compensation method performed by the RU 100 having the configuration described above will be described with reference to the flowchart illustrated in FIG. 14. In FIG. 14, processes that are the same as those illustrated in FIG. 3 are assigned the same reference numerals and descriptions thereof in detail will be omitted.

In a predetermined time period, such as at the time of startup of the RU 100 or update of the filter coefficient that is performed in a predetermined cycle, a process for setting the batch filter coefficient in the variation correction unit 502 is performed. The transmission baseband signal transmitted from the CU/DU 10 during this time period is received by the communication I/F unit 110 and is input to the processor 120. Then, the transmission signal is input to the analog characteristic estimation unit 124.

Furthermore, after the transmission signal is subjected to distortion compensation by the distortion compensation unit 121 and is subjected to D/A conversion and up-conversion, an antenna weight for beamforming is added to the transmission signal by the phase shifter 150, and the transmission signal is amplified by the power amplifier 160 and is then transmitted to the wireless space. At this time, the signal amplified by the power amplifier 160 is fed back to the phase shifter 170, is subjected to down-conversion and A/D conversion, passes through the variation correction unit 502 as the FB signal, and is input to the analog characteristic estimation unit 124.

In the analog characteristic estimation unit 124 in which the transmission signal and the FB signal are input, a process for estimating the analog characteristics exhibited in the respective feedback paths is performed by using the transmission signal and the FB signal (Step S101). If the analog characteristics exhibited in the respective feedback paths have been estimated, the path based filter coefficient associated with the analog characteristics exhibited in the respective feedback paths is calculated by the filter coefficient calculation unit 125 (Step S102). Then, the batch filter coefficient is calculated by obtaining the sum of the path based filter coefficients by the filter coefficient calculation unit 125 (Step S103).

The batch filter coefficient is output to the inverse characteristic conversion unit 501, and the batch filter coefficient is converted to the inverse characteristic by the inverse characteristic conversion unit 501 (Step S501). In other words, the batch filter coefficient that collectively cancels out the analog characteristics that are added to the respective FB signals in the respective plurality of feedback paths is derived. The batch filter coefficient of the inverse characteristic is notified to the variation correction unit 502, and is set in the FIR filter included in the variation correction unit 502 (Step S502). As a result, the setting process performed in the predetermined time period, such as at the time of startup of the RU 100 or update of the filter coefficient, has been completed. When the batch filter coefficient of the inverse characteristic has been set in the variation correction unit 502, the usual signal transmission process is performed after this. In other words, after the transmission signal is subjected to distortion compensation by the distortion compensation unit 121 (Step S105) and is subjected to D/A conversion and up-conversion, the antenna weight for beamforming is added to the transmission signal by the phase shifter 150, and the transmission signal is amplified by the power amplifier 160 and is then transmitted to the wireless space.

Furthermore, the signals amplified by the respective power amplifiers 160 associated with the respective antenna elements are fed back via the respective feedback paths and are combined after an inverse weight is added to each of the signals by the phase shifter 170. The inverse characteristics of the respective analog characteristics exhibited in the respective feedback paths are collectively added to the combined FB signal by the variation correction unit 502, and the corrected FB signal is input to the coefficient updating unit 122. In contrast, the transmission signal that has not been subjected to distortion compensation is also input to the coefficient updating unit 122, and the distortion compensation coefficient that is used by the distortion compensation unit 121 is updated by the coefficient updating unit 122 by using the transmission signal and the FB signal.

At the time of an update of the distortion compensation coefficient, the FB signal obtained by combining the signals each passing through a different feedback path is used; however, the inverse characteristic of the analog characteristic of the feedback path is added to the FB signal, so that it is possible to reduce the effect of variations in the analog characteristics. As a result, it is possible to improve the accuracy of the distortion compensation coefficient, and prevent a decrease in distortion compensation performance. Furthermore, when the inverse characteristic of the analog characteristic exhibited in the feedback path is added to the FB signal, only one FIR filter included in the variation correction unit 502 is operated, it is thus possible to suppress an increase in electrical power consumption.

As described above, according to the present embodiment, the batch filter coefficient that corrects the analog characteristics exhibited in the respective plurality of feedback paths is converted to the inverse characteristic, and the FB signal is collectively corrected by using the batch filter coefficient of the inverse characteristic. As a result, it is possible to correct the variations in the analog characteristics by operating the multipliers included in one filter, and it is thus possible to accurately update the distortion compensation coefficients. As a result, it is possible to prevent a decrease in distortion compensation performance while suppressing an increase in electrical power consumption.

[f] Sixth Embodiment

The characteristic of the sixth embodiment is that a batch filter coefficient is calculated for each beam direction, and the variations in the analog characteristics exhibited in the respective feedback paths are corrected by using the batch filter coefficient associated with the beam direction.

A configuration of a communication system according to a sixth embodiment is the same as that in the first embodiment (see FIG. 1); therefore, descriptions thereof will be omitted. In the sixth embodiment, the configuration of the processor 120 included in the RU 100 is different from that described in the first embodiment (see FIG. 2).

Figure 15:
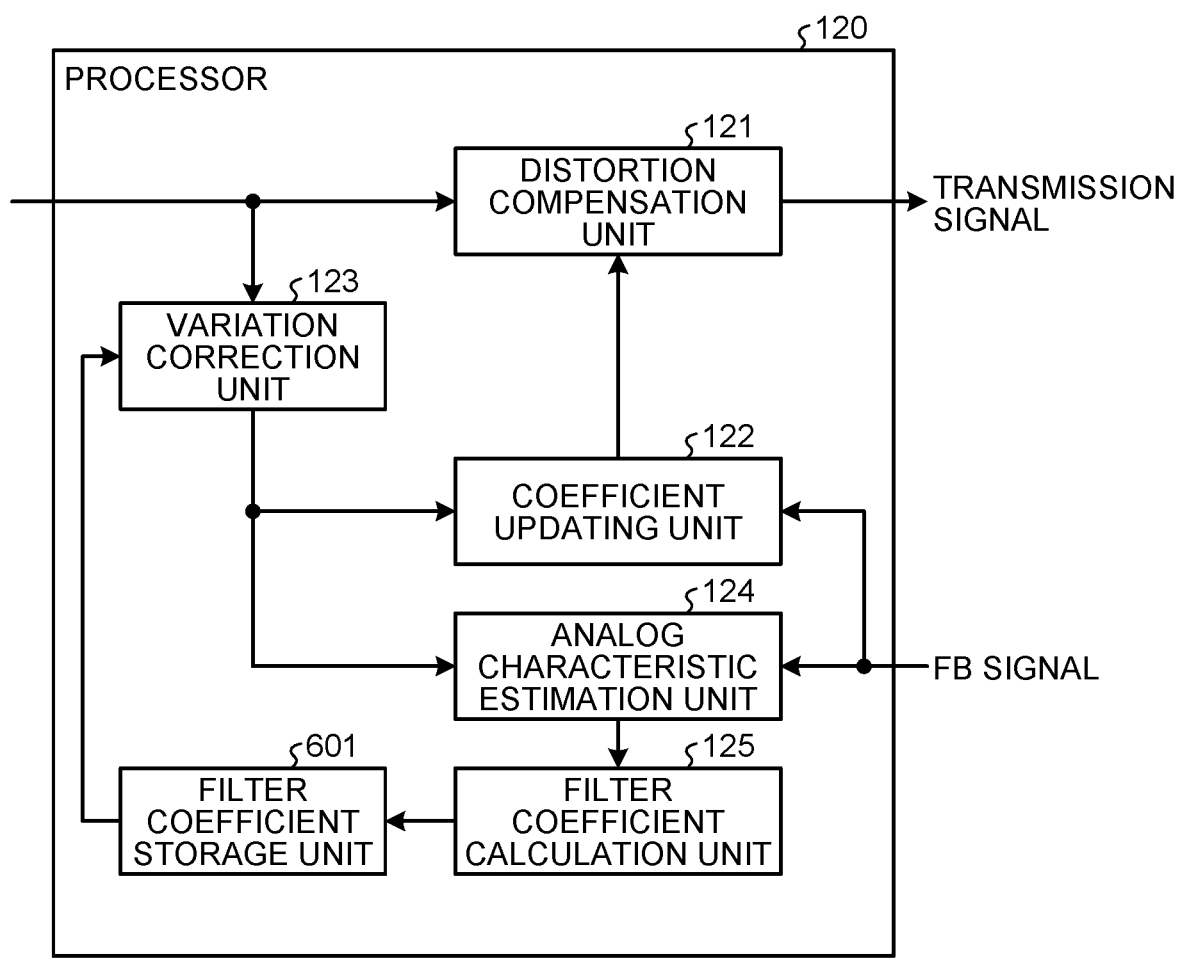
FIG. 15 is a block diagram illustrating a configuration of a processor according to a sixth embodiment.

FIG. 15 is a block diagram illustrating the configuration of the processor 120 according to the sixth embodiment. In FIG. 15, components that are the same as those illustrated in FIG. 2 are assigned the same reference numerals and descriptions thereof will be omitted. The processor 120 illustrated in FIG. 15 has a configuration in which a filter coefficient storage unit 601 is added to the processor 120 illustrated in FIG. 2.

The filter coefficient storage unit 601 stores therein the beam direction in an associated manner with the batch filter coefficient that is calculated by the filter coefficient calculation unit 125. In other words, the filter coefficient storage unit 601 stores therein the batch filter coefficient in an associated manner with the direction of a transmission beam that is formed by the phase shifter 150 in a predetermined time period, such as at the time of startup of the RU 100 or update of the filter coefficient that is performed in a predetermined cycle. Then, the filter coefficient storage unit 601 acquires information on the direction of the transmission beam at the time of usual signal transmission process, and notifies the variation correction unit 123 of the batch filter coefficient associated with the beam direction.

Figure 16:
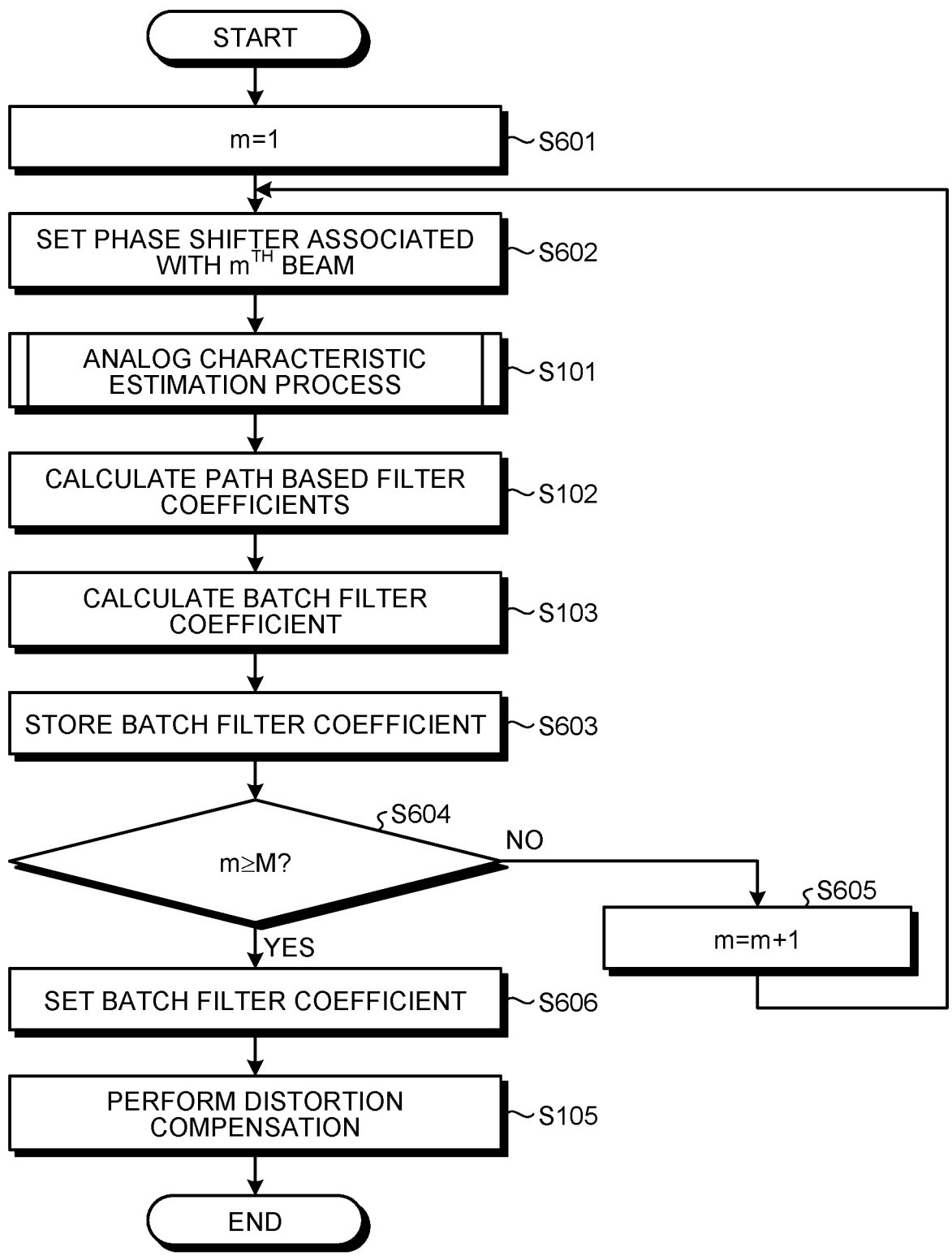
FIG. 16 is a flowchart illustrating a distortion compensation method according to the sixth embodiment.

In the following, a distortion compensation method performed by the RU 100 having configuration described above will be described with reference to the flowchart illustrated in FIG. 16. In FIG. 16, processes that are the same as those illustrated in FIG. 3 are assigned the same reference numerals and descriptions thereof in detail will be omitted.

In a predetermined time period, such as at the time of startup of the RU 100 or update of the filter coefficient that is performed in a predetermined cycle, a process for storing the batch filter coefficient in the filter coefficient storage unit 601 is performed. The transmission baseband signal transmitted from the CU/DU 10 during this time period is received by the communication I/F unit 110 and is input to the processor 120. Then, the transmission signal passes through the variation correction unit 123 and is input to the analog characteristic estimation unit 124.

Furthermore, an identification number m of the beam direction is initialized to 1 (Step S601), the antenna weight associated with the $m^{th}$ beam direction is set in the phase shifter 150 (Step S602). As a result, the RU 100 forms a transmission beam oriented in the $m^{th}$ beam direction.

After the transmission signal is subjected to distortion compensation by the distortion compensation unit 121 and is subjected to D/A conversion and up-conversion, the antenna weight associated with the $m^{th}$ beam direction is added to the transmission signal by the phase shifter 150, and the transmission signal is amplified by the power amplifier 160 and is then transmitted to the $m^{th}$ beam direction. At this time, the signal amplified by the power amplifier 160 is fed back to the phase shifter 170, is subjected to down-conversion and A/D conversion, and is then input to the analog characteristic estimation unit 124.

In the analog characteristic estimation unit 124 in which the transmission signal and the FB signal are input, a process for estimating the analog characteristics exhibited in the respective feedback path is performed by using the transmission signal and the FB signal (Step S101). When the analog characteristics exhibited in the respective feedback paths have been estimated, the path based filter coefficient associated with each of the analog characteristics exhibited in the respective feedback paths is calculated by the filter coefficient calculation unit 125 (Step S102). Then, the batch filter coefficient is calculated by obtaining the sum of the path based filter coefficients preformed by the filter coefficient calculation unit 125 (Step S103).

The calculated batch filter coefficient is stored by the filter coefficient storage unit 601 in an associated manner with the $m^{th}$ beam direction (Step S603). Then, it is determined whether or not the identification number m is greater than or equal to the total number of M of the beam direction (Step S604), and, if the identification number m is less than M (No at Step S604), the identification number m is incremented (Step S605). Then, similarly to the case described above, the batch filter coefficient in the case where the transmission beam oriented in the $m^{th}$ beam direction is formed is calculated and is stored by the filter coefficient storage unit 601.

Then, if the identification number m is greater than or equal to M (Yes at Step S604), and if the batch filter coefficient is stored in an associated manner with all of the beam directions, the usual signal transmission process is performed after this. At this time, if the antenna weight for beamforming is set in the phase shifter 150, the batch filter coefficient associated with the direction of the transmission beam is notified from the filter coefficient storage unit 601 to the variation correction unit 123 and is set in the FIR filter included in the variation correction unit 123 (Step S606).

Then, after the transmission signal is subjected to distortion compensation by the distortion compensation unit 121 (Step S105) and is subjected to D/A conversion and up-conversion, an antenna weight for beamforming is added to the transmission signal by the phase shifter 150, and the transmission signal is amplified by the power amplifier 160 and is then transmitted to wireless space.

Furthermore, the signals amplified by the respective power amplifiers 160 associated with the respective antenna elements are fed back via the respective feedback paths and are combined after an inverse weight is added to each of the signals by the phase shifter 170. The combined FB signal is input to the coefficient updating unit 122. In contrast, the transmission signal that has not been distortion compensation is corrected by using the batch filter coefficient in accordance with the beam direction performed by the variation correction unit 123, and the corrected transmission signal is input to the coefficient updating unit 122. Then, the distortion compensation coefficient that is used by the distortion compensation unit 121 is updated by the coefficient updating unit 122 by using the transmission signal and the FB signal.

At the time of an update of the distortion compensation coefficient, the FB signal obtained by combining the signals each passing through a different feedback path and the transmission signal is used; however, the same characteristic as the analog characteristic exhibited in the associated feedback path is added to the transmission signal, so that it is possible to reduce the effect of variations in the analog characteristics. As a result, it is possible to improve the accuracy of the distortion compensation coefficient, and prevent a decrease in distortion compensation performance. Furthermore, when the same characteristic as the analog characteristic exhibited in the associated feedback path is added to the transmission signal, only one FIR filter included in the variation correction unit 123 is operated, it is thus possible to suppress an increase in electrical power consumption. Furthermore, correction of variations is performed in accordance with beam direction, so that it is possible to implement an appropriate correction associated with a change in weight in the phase shifters 150 and 170.

As described above, according to the present embodiment, batch filter coefficient for correcting the analog characteristics exhibited in the respective plurality of feedback paths is stored in an associated manner with the beam direction, and the variations in the analog characteristics exhibited in the respective feedback paths are corrected by using the batch filter coefficient that is associated with the transmission beam. As a result, it is possible to appropriately correct the variations in the analog characteristics in accordance with the beam direction.

Furthermore, in each of the embodiments described above, it is assumed that the path based filter coefficient is calculated for all of the plurality of feedback paths, and the batch filter coefficient is calculated from these path based filter coefficients. However, the path based filter coefficient need not always be calculated for all of the feedback paths. Alternatively, a path based filter coefficient may be calculated for some feedback paths, and the batch filter coefficient may be calculated from these path based filter coefficients.

Furthermore, in the process for estimating the analog characteristic of the feedback path, the gain, delay, phase, and frequency characteristics need not always be estimated for each feedback path. In other words, for example, the FB signals associated with two or more feedback paths may be collectively fed back, and the analog characteristics exhibited in the feedback circuits associated with these FB signals may be estimated.

The first to the sixth embodiments described above may also be appropriately used in combination. For example, by using the second and the third embodiments in combination, calibration of the phase shifter may be performed when correction is performed on the FB signal and the transmission signal. Furthermore, for example, by using the fourth and the sixth embodiments in combination, after the path based filter coefficient has been derived by using the convergence algorithm, the batch filter coefficient for each beam direction may be calculated, and the variations in the analog characteristics may be corrected by using the batch filter coefficient in accordance with the transmission beam.

According to an aspect of an embodiment of the wireless communication apparatus and the distortion compensation method disclosed in the present invention, an advantage is provided in that it is possible to prevent a decrease in distortion compensation performance while suppressing an increase in electrical power consumption.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus comprising:
a plurality of antenna elements;
a plurality of power amplifiers provided in the plurality of antenna elements;
a processor that outputs a transmission signal to the plurality of power amplifiers; and
a plurality of feedback paths each of which allows a feedback signal to be fed back from the plurality of power amplifiers to the processor, wherein the processor executes a process comprising:
collectively correcting variations in analog characteristics exhibited in the plurality of feedback paths, and
updating, by using the transmission signal and the feedback signal that are obtained by being corrected, a distortion compensation coefficient that is used to compensate nonlinear distortion produced in the plurality of power amplifiers.

2. The wireless communication apparatus according to claim 1, wherein the collectively correcting includes collectively correcting the variations related to at least one of gain, delay, phase, and frequency characteristics exhibited in the plurality of feedback paths.

3. The wireless communication apparatus according to claim 1, wherein the processor further executes a process comprising:
estimating the analog characteristics exhibited in the plurality of feedback paths; and
calculating a filter coefficient that is used to collectively correct the estimated analog characteristics.

4. The wireless communication apparatus according to claim 3, wherein the calculating includes calculating a path based filter coefficient associated with each of the analog characteristics exhibited in the respective plurality of feedback paths, and
calculating a batch filter coefficient by obtaining a sum of the path based filter coefficients.

5. The wireless communication apparatus according to claim 1, wherein the collectively correcting includes adding, to the transmission signal, a same characteristic as the analog characteristics exhibited in the plurality of feedback paths.

6. The wireless communication apparatus according to claim 1, wherein the collectively correcting includes adding, to the feedback signal, an inverse characteristic of the analog characteristics exhibited in the plurality of feedback paths.

7. The wireless communication apparatus according to claim 1, wherein the collectively correcting includes
performing correction on the feedback signal regarding an average amount of the analog characteristics exhibited in the plurality of feedback paths, and
performing correction on the transmission signal regarding a variation amount excluding the average amount.

8. The wireless communication apparatus according to claim 1, wherein the processor further executes a process comprising:
calculating, from the transmission signal and the feedback signal that is associated with each of the plurality of feedback paths, a path based filter coefficient associated with each of the analog characteristics exhibited in the respective plurality of feedback paths by using a convergence algorithm; and
calculating a batch filter coefficient by obtaining a sum of the path based filter coefficients.

9. The wireless communication apparatus according to claim 1, wherein the processor further executes a process comprising:
calculating, for each direction of a transmission beam, a filter coefficient that is used to collectively correct the analog characteristics exhibited in the plurality of feedback paths; and
storing the calculated filter coefficient in an associated manner with the direction of the transmission beam.

10. A distortion compensation method performed by a wireless communication apparatus that includes
a plurality of antenna elements, a plurality of power amplifiers provided in the plurality of antenna elements, a processor that outputs a transmission signal to the plurality of power amplifiers, and a plurality of feedback paths each of which allows a feedback signal to be fed back from the plurality of power amplifiers to the processor, the distortion compensation method comprising:

collectively correcting variations in analog characteristics exhibited in the plurality of feedback paths, and updating, by using the transmission signal and the feedback signal that are obtained by being corrected, a distortion compensation coefficient that is used to compensate nonlinear distortion produced in the plurality of power amplifiers.

* * * * *